United States Patent [19]
Murata

[11] Patent Number: 5,524,026
[45] Date of Patent: Jun. 4, 1996

[54] METHOD AND APPARATUS FOR JUDGING TIMING PHASE OF MODEM WHICH IS USED IN DATA COMMUNICATION

[75] Inventor: Hiroyasu Murata, Kawasaki, Japan

[73] Assignee: Fujitsu Limited, Kawasaki, Japan

[21] Appl. No.: 160,180

[22] Filed: Dec. 2, 1993

[30] Foreign Application Priority Data

Dec. 15, 1992 [JP] Japan .................................. 4-333401

[51] Int. Cl.$^6$ .................................................. H03D 3/22
[52] U.S. Cl. ........................ 375/329; 375/331; 375/332
[58] Field of Search ..................................... 375/329, 331, 375/332, 279, 280, 229, 340, 362; 370/105.3

[56] References Cited

U.S. PATENT DOCUMENTS

| | | | |
|---|---|---|---|
| 3,727,136 | 4/1973 | Schroeder et al. ...................... | 325/320 |
| 3,969,674 | 7/1976 | Tracey ........................................ | 325/42 |
| 4,234,957 | 11/1980 | Tracey et al. ............................. | 375/86 |
| 4,631,738 | 12/1986 | Betts et al. ................................ | 375/98 |
| 4,771,438 | 9/1988 | Nash ........................................ | 375/15 |
| 5,093,847 | 3/1992 | Cheng ...................................... | 375/97 |

*Primary Examiner*—Edward L. Coles, Sr.
*Assistant Examiner*—Madeleine Anh-Vinh Nguyen
*Attorney, Agent, or Firm*—Staas & Halsey

[57] ABSTRACT

A numerical value $(Y-X)\cdot 0.5$ indicative of a phase angle $\theta_1$ in the first quadrant is calculated on the assumption that a quadrant of an input vector signal $(x+jy)$ is judged and the signal is rotated into the first quadrant by a rotational vector signal $(a+jb)$ and the phase angle of 0 to $\pi$ is expressed by 0 to $+2$ and the phase angle of $\pi$ to $2\pi$ is expressed by $-2$ to 0 as a prerequisite. Further, a numerical value c indicative of an offset phase angle $\theta_2$ to return the vector signal into the original signal and the phase number indicative of each of the (N) divided phase regions of the phase plane is directly obtained as bit data.

30 Claims, 30 Drawing Sheets

FIG. 11

| PHASE No. | JUDGEMENT ANGLE (°) | TIMJD D0 bit0 | D1 bit2 bit1 bit0 | D2 bit2 bit1 bit0 |
|---|---|---|---|---|
| 64 | 180 ~ 182.8125 | 1 | 000 | 000 |
| 65 | 182.8125 ~ 185.625 | 1 | 000 | 001 |
| 66 | 185.625 ~ 188.4375 | 1 | 000 | 010 |
| 67 | 188.4375 ~ 191.25 | 1 | 000 | 011 |
| 68 | 191.25 ~ 194.0625 | 1 | 000 | 100 |
| 69 | 194.0625 ~ 196.875 | 1 | 000 | 101 |
| 70 | 196.875 ~ 199.6875 | 1 | 000 | 110 |
| 71 | 199.6875 ~ 202.5 | 1 | 000 | 111 |
| 72 | 202.5 ~ 205.3125 | 1 | 001 | 000 |
| 73 | 205.3125 ~ 208.125 | 1 | 001 | 001 |
| 74 | 208.125 ~ 210.9375 | 1 | 001 | 010 |
| 75 | 210.9375 ~ 213.75 | 1 | 001 | 011 |
| 76 | 213.75 ~ 216.5625 | 1 | 001 | 100 |
| 77 | 216.5625 ~ 219.375 | 1 | 001 | 101 |
| 78 | 219.375 ~ 222.1875 | 1 | 001 | 110 |
| 79 | 222.1875 ~ 225 | 1 | 001 | 111 |
| 80 | 225 ~ 227.8125 | 1 | 010 | 000 |
| 81 | 227.8125 ~ 230.625 | 1 | 010 | 001 |
| 82 | 230.625 ~ 233.4375 | 1 | 010 | 010 |
| 83 | 233.4375 ~ 236.25 | 1 | 010 | 011 |
| 84 | 236.25 ~ 239.0625 | 1 | 010 | 100 |
| 85 | 239.0625 ~ 241.875 | 1 | 010 | 101 |
| 86 | 241.875 ~ 244.6875 | 1 | 010 | 110 |
| 87 | 244.6875 ~ 247.5 | 1 | 010 | 111 |
| 88 | 247.5 ~ 250.3125 | 1 | 011 | 000 |
| 89 | 250.3125 ~ 253.125 | 1 | 011 | 001 |
| 90 | 253.125 ~ 255.9375 | 1 | 011 | 010 |
| 91 | 255.9375 ~ 258.75 | 1 | 011 | 011 |
| 92 | 258.75 ~ 261.5625 | 1 | 011 | 100 |
| 93 | 261.5625 ~ 264.375 | 1 | 011 | 101 |
| 94 | 264.375 ~ 267.1875 | 1 | 011 | 110 |
| 95 | 267.1875 ~ 270 | 1 | 011 | 111 |

FIG. 12

| PHASE No. | JUDGEMENT ANGLE (°) | TIMJD D0 bit0 | TIMJD D1 bit2 bit1 bit0 | TIMJD D2 bit2 bit1 bit0 |
|---|---|---|---|---|
| 96  | 270      ~ 272.8125 | 1 | 1 0 0 | 0 0 0 |
| 97  | 272.8125 ~ 275.625  | 1 | 1 0 0 | 0 0 1 |
| 98  | 275.625  ~ 278.4375 | 1 | 1 0 0 | 0 1 0 |
| 99  | 278.4375 ~ 281.25   | 1 | 1 0 0 | 0 1 1 |
| 100 | 281.25   ~ 284.0625 | 1 | 1 0 0 | 1 0 0 |
| 101 | 284.0625 ~ 286.875  | 1 | 1 0 0 | 1 0 1 |
| 102 | 286.875  ~ 289.6875 | 1 | 1 0 0 | 1 1 0 |
| 103 | 289.6875 ~ 292.5    | 1 | 1 0 0 | 1 1 1 |
| 104 | 292.5    ~ 295.3125 | 1 | 1 0 1 | 0 0 0 |
| 105 | 295.3125 ~ 298.125  | 1 | 1 0 1 | 0 0 1 |
| 106 | 298.125  ~ 300.9375 | 1 | 1 0 1 | 0 1 0 |
| 107 | 300.9375 ~ 303.75   | 1 | 1 0 1 | 0 1 1 |
| 108 | 303.75   ~ 306.5625 | 1 | 1 0 1 | 1 0 0 |
| 109 | 306.5625 ~ 309.375  | 1 | 1 0 1 | 1 0 1 |
| 110 | 309.375  ~ 312.1875 | 1 | 1 0 1 | 1 1 0 |
| 111 | 312.1875 ~ 315      | 1 | 1 0 1 | 1 1 1 |
| 112 | 315      ~ 317.8125 | 1 | 1 1 0 | 0 0 0 |
| 113 | 317.8125 ~ 320.625  | 1 | 1 1 0 | 0 0 1 |
| 114 | 320.625  ~ 323.4375 | 1 | 1 1 0 | 0 1 0 |
| 115 | 323.4375 ~ 326.25   | 1 | 1 1 0 | 0 1 1 |
| 116 | 326.25   ~ 329.0625 | 1 | 1 1 0 | 1 0 0 |
| 117 | 329.0625 ~ 331.875  | 1 | 1 1 0 | 1 0 1 |
| 118 | 331.875  ~ 334.6875 | 1 | 1 1 0 | 1 1 0 |
| 119 | 334.6875 ~ 337.5    | 1 | 1 1 0 | 1 1 1 |
| 120 | 337.5    ~ 340.3125 | 1 | 1 1 1 | 0 0 0 |
| 121 | 340.3125 ~ 343.125  | 1 | 1 1 1 | 0 0 1 |
| 122 | 343.125  ~ 345.9375 | 1 | 1 1 1 | 0 1 0 |
| 123 | 345.9375 ~ 348.75   | 1 | 1 1 1 | 0 1 1 |
| 124 | 348.75   ~ 351.5625 | 1 | 1 1 1 | 1 0 0 |
| 125 | 351.5625 ~ 354.375  | 1 | 1 1 1 | 1 0 1 |
| 126 | 354.375  ~ 357.1875 | 1 | 1 1 1 | 1 1 0 |
| 127 | 357.1875 ~ 360      | 1 | 1 1 1 | 1 1 1 |

FIG. 13

| PHASE No. | JUDGEMENT ANGLE (°) | TIMJD D0 bit 0 | TIMJD D1 bit2 bit1 bit0 | TIMJD D2 bit2 bit1 bit0 |
|---|---|---|---|---|
| 0 | 0 ~ 2.8125 | 0 | 000 | 000 |
| 1 | 2.8125 ~ 5.625 | 0 | 000 | 001 |
| 2 | 5.625 ~ 8.4375 | 0 | 000 | 010 |
| 3 | 8.4375 ~ 11.25 | 0 | 000 | 011 |
| 4 | 11.25 ~ 14.0625 | 0 | 000 | 100 |
| 5 | 14.0625 ~ 16.875 | 0 | 000 | 101 |
| 6 | 16.875 ~ 19.6875 | 0 | 000 | 110 |
| 7 | 19.6785 ~ 22.5 | 0 | 000 | 111 |
| 8 | 22.5 ~ 25.3125 | 0 | 001 | 000 |
| 9 | 25.3125 ~ 28.125 | 0 | 001 | 001 |
| 10 | 28.125 ~ 30.9375 | 0 | 001 | 010 |
| 11 | 30.9375 ~ 33.75 | 0 | 001 | 011 |
| 12 | 33.75 ~ 36.5625 | 0 | 001 | 100 |
| 13 | 36.5625 ~ 39.375 | 0 | 001 | 101 |
| 14 | 39.375 ~ 42.1875 | 0 | 001 | 110 |
| 15 | 42.1875 ~ 45 | 0 | 001 | 111 |
| 16 | 45 ~ 47.8125 | 0 | 010 | 000 |
| 17 | 47.8125 ~ 50.625 | 0 | 010 | 001 |
| 18 | 50.625 ~ 53.4375 | 0 | 010 | 010 |
| 19 | 53.4375 ~ 56.25 | 0 | 010 | 011 |
| 20 | 56.25 ~ 59.0625 | 0 | 010 | 100 |
| 21 | 59.0625 ~ 61.875 | 0 | 010 | 101 |
| 22 | 61.875 ~ 64.6875 | 0 | 010 | 110 |
| 23 | 64.6875 ~ 67.5 | 0 | 010 | 111 |
| 24 | 67.5 ~ 70.3125 | 0 | 011 | 000 |
| 25 | 70.3125 ~ 73.125 | 0 | 011 | 001 |
| 26 | 73.125 ~ 75.9375 | 0 | 011 | 010 |
| 27 | 75.9375 ~ 78.75 | 0 | 011 | 011 |
| 28 | 78.75 ~ 81.5625 | 0 | 011 | 100 |
| 29 | 81.5625 ~ 84.375 | 0 | 011 | 101 |
| 30 | 84.375 ~ 87.1875 | 0 | 011 | 110 |
| 31 | 87.1875 ~ 90 | 0 | 011 | 111 |

FIG. 14

| PHASE No. | JUDGEMENT ANGLE (°) | TIMJD D0 blt0 | D1 blt2 blt1 blt0 | D2 blt2 blt1 blt0 |
|---|---|---|---|---|
| 32 | 90 ~ 92.8125 | 0 | 1 0 0 | 0 0 0 |
| 33 | 92.8125 ~ 95.625 | 0 | 1 0 0 | 0 0 1 |
| 34 | 95.625 ~ 98.4375 | 0 | 1 0 0 | 0 1 0 |
| 35 | 98.4375 ~ 101.25 | 0 | 1 0 0 | 0 1 1 |
| 36 | 101.25 ~ 104.0625 | 0 | 1 0 0 | 1 0 0 |
| 37 | 104.0625 ~ 106.875 | 0 | 1 0 0 | 1 0 1 |
| 38 | 106.875 ~ 109.6875 | 0 | 1 0 0 | 1 1 0 |
| 39 | 109.6875 ~ 112.5 | 0 | 1 0 0 | 1 1 1 |
| 40 | 112.5 ~ 115.3125 | 0 | 1 0 1 | 0 0 0 |
| 41 | 115.3125 ~ 118.125 | 0 | 1 0 1 | 0 0 1 |
| 42 | 118.125 ~ 120.9375 | 0 | 1 0 1 | 0 1 0 |
| 43 | 120.9375 ~ 123.75 | 0 | 1 0 1 | 0 1 1 |
| 44 | 123.75 ~ 126.5625 | 0 | 1 0 1 | 1 0 0 |
| 45 | 126.5625 ~ 129.375 | 0 | 1 0 1 | 1 0 1 |
| 46 | 129.375 ~ 132.1875 | 0 | 1 0 1 | 1 1 0 |
| 47 | 132.1875 ~ 135 | 0 | 1 0 1 | 1 1 1 |
| 48 | 135 ~ 137.8125 | 0 | 1 1 0 | 0 0 0 |
| 49 | 137.8125 ~ 140.625 | 0 | 1 1 0 | 0 0 1 |
| 50 | 140.625 ~ 143.4375 | 0 | 1 1 0 | 0 1 0 |
| 51 | 143.4375 ~ 146.25 | 0 | 1 1 0 | 0 1 1 |
| 52 | 146.25 ~ 149.0625 | 0 | 1 1 0 | 1 0 0 |
| 53 | 149.0625 ~ 151.875 | 0 | 1 1 0 | 1 0 1 |
| 54 | 151.875 ~ 154.6875 | 0 | 1 1 0 | 1 1 0 |
| 55 | 154.6875 ~ 157.5 | 0 | 1 1 0 | 1 1 1 |
| 56 | 157.5 ~ 160.3125 | 0 | 1 1 1 | 0 0 0 |
| 57 | 160.3125 ~ 163.125 | 0 | 1 1 1 | 0 0 1 |
| 58 | 163.125 ~ 165.9375 | 0 | 1 1 1 | 0 1 0 |
| 59 | 165.9375 ~ 168.75 | 0 | 1 1 1 | 0 1 1 |
| 60 | 168.75 ~ 171.5625 | 0 | 1 1 1 | 1 0 0 |
| 61 | 171.5625 ~ 174.375 | 0 | 1 1 1 | 1 0 1 |
| 62 | 174.375 ~ 177.1875 | 0 | 1 1 1 | 1 1 0 |
| 63 | 177.1875 ~ 180 | 0 | 1 1 1 | 1 1 1 |

NOT ROTATE
$\theta_2 = 0.5$

ROTATE BY $-90°$
$\theta_2 = 1.5$

ROTATE BY $-180°$
$\theta_2 = -1.5$

ROTATE BY $-270°$
$\theta_2 = -0.5$ $\theta = \theta_1 + \theta_2$
WHERE $\theta_1 = (Y-X) \cdot 0.5$

FIG. 25

| D1 bit2 bit1 bit0 | JUMP ANGLE (°) | TAP COEFFICIENT ||||||
|---|---|---|---|---|---|---|---|
| | | $C1_1$ | $C1_2$ | $C1_3$ | $C1_4$ | $C1_5$ | $C1_6$ |
| 1 1 1 | −157.5 | $K1_{01}$ | $K1_{09}$ | $K1_{17}$ | $K1_{25}$ | $K1_{33}$ | $K1_{41}$ |
| 1 1 0 | −135.0 | $K1_{02}$ | $K1_{10}$ | $K1_{18}$ | $K1_{26}$ | $K1_{34}$ | $K1_{42}$ |
| 1 0 1 | −112.5 | $K1_{03}$ | $K1_{11}$ | $K1_{19}$ | $K1_{27}$ | $K1_{35}$ | $K1_{43}$ |
| 1 0 0 | − 90 | $K1_{04}$ | $K1_{12}$ | $K1_{20}$ | $K1_{28}$ | $K1_{36}$ | $K1_{44}$ |
| 0 1 1 | − 67.5 | $K1_{05}$ | $K1_{13}$ | $K1_{21}$ | $K1_{29}$ | $K1_{37}$ | $K1_{45}$ |
| 0 1 0 | − 45 | $K1_{06}$ | $K1_{14}$ | $K1_{22}$ | $K1_{30}$ | $K1_{38}$ | $K1_{46}$ |
| 0 0 1 | − 22.5 | $K1_{07}$ | $K1_{15}$ | $K1_{23}$ | $K1_{31}$ | $K1_{39}$ | $K1_{47}$ |
| 0 0 0 | 0 | $K1_{08}$ | $K1_{16}$ | $K1_{24}$ | $K1_{32}$ | $K1_{40}$ | $K1_{48}$ |

FIG. 26

| D2 bit2 bit1 bit0 | JUMP ANGLE (°) | TAP COEFFICIENT ||||||
|---|---|---|---|---|---|---|---|
| | | $C2_1$ | $C2_2$ | $C2_3$ | $C2_4$ | $C2_5$ | $C2_6$ |
| 1 1 1 | −21.09375 | $K2_{01}$ | $K2_{09}$ | $K2_{17}$ | $K2_{25}$ | $K2_{33}$ | $K2_{41}$ |
| 1 1 0 | −18.28125 | $K2_{02}$ | $K2_{10}$ | $K2_{18}$ | $K2_{26}$ | $K2_{34}$ | $K2_{42}$ |
| 1 0 1 | −15.46875 | $K2_{03}$ | $K2_{11}$ | $K2_{19}$ | $K2_{27}$ | $K2_{35}$ | $K2_{43}$ |
| 1 0 0 | −12.65625 | $K2_{04}$ | $K2_{12}$ | $K2_{20}$ | $K2_{28}$ | $K2_{36}$ | $K2_{44}$ |
| 0 1 1 | − 9.84375 | $K2_{05}$ | $K2_{13}$ | $K2_{21}$ | $K2_{29}$ | $K2_{37}$ | $K2_{45}$ |
| 0 1 0 | − 7.03125 | $K2_{06}$ | $K2_{14}$ | $K2_{22}$ | $K2_{30}$ | $K2_{38}$ | $K2_{46}$ |
| 0 0 1 | − 4.21875 | $K2_{07}$ | $K2_{15}$ | $K2_{23}$ | $K2_{31}$ | $K2_{39}$ | $K2_{47}$ |
| 0 0 0 | − 1.40625 | $K2_{08}$ | $K2_{16}$ | $K2_{24}$ | $K2_{32}$ | $K2_{40}$ | $K2_{48}$ |

$$\begin{bmatrix} -(wc-wx) \sim wc-wx : \text{NO ATTENUATION} \\ -wc, wc : 6\,dB \text{ ATTENUATION} \end{bmatrix}$$

FIG. 32

| QUADRANT | I | II | III | IV | CORRESPONDENCE TO THE FIRST EMBODIMENT |
|---|---|---|---|---|---|
| ROTATIONAL ANGLE $\theta_2$ | 0 | -90 | -180 | -270 | $\theta_2$ |
| $a\ (=\cos\theta_2)$ | 1 | 0 | -1 | 0 | a |
| $b\ (=\sin\theta_2)$ | 0 | -1 | 0 | 1 | b |
| $xa-yb\ (=x\cos\theta_2+y\sin\theta_2)$ | x | y | -x | -y | REAL COMPONENT X |
| $ya+xb\ (=y\cos\theta_2+x\sin\theta_2)$ | y | -x | -y | x | IMAGINARY COMPONENT Y |
| $-(xa-yb)+(ya+xb)$ | $-x+y$ | $-x-y$ | $x-y$ | $x+y$ | $(Y-X)$ |
| $\theta_1=(-(xa-yb)+(ya+xb))\cdot 0.5$ | $-0.5x+0.5y$ | $-0.5x-0.5y$ | $0.5x-0.5y$ | $0.5x+0.5y$ | $(Y-X)\cdot 0.5$ |
| $A\ (=-0.5a+0.5b)$ | $-0.5$ | $-0.5$ | $0.5$ | $0.5$ | |
| $B\ (=+0.5a+0.5b)$ | $0.5$ | $-0.5$ | $-0.5$ | $0.5$ | |

5,524,026

METHOD AND APPARATUS FOR JUDGING TIMING PHASE OF MODEM WHICH IS USED IN DATA COMMUNICATION

BACKGROUND OF THE INVENTION

The present invention relates to method and apparatus for judging a timing phase of a modem which is used in data communication for judging a timing phase from a reception signal of a communication line and, more particularly, to method and apparatus for judging a timing phase of a modem for judging the optimum timing phase.

In a single sampling type automatic equalizer which is used in the case where baud rate frequency doesn't satisfy a sampling theorem, an overlap on a frequency spectrum occurs. A degree of overlap on the spectrum is largely influenced by a timing phase and causes a deterioration of the performance of the automatic equalizer. Therefore, the timing phase is judged from the line reception signal and tap coefficients of a filter are controlled, thereby controlling so as to obtain the optimum phase.

However, in the construction to judge the timing phase by using a digital signal processor, when the number of divided portions of a phase plane is increased to improve a judging accuracy, a processing amount and a hardware amount of an ROM and the like increase. Therefore, it is demanded to judge the timing phase at a high precision without being influenced by the phase dividing number.

FIG. 1 shows a receiving section of a conventional data modem. A reception signal from a communication line is sampled to a digital value and given to a demodulating section 16 and is demodulated as a vector signal (x+jy) having a real component x and an imaginary component y indicative of a signal point of a phase plane. The demodulated vector signal is given to a phase control filter 18, a roll-off filter 20, an AGC circuit section 22, and an automatic equalizer 24. Further, the correct data signal point is judged by a judging section (not shown) and, after that, the vector signal is converted into the original transmission data. A timing extracting section 34 and a timing phase judging section 36 are provided on the branch side of an output of the phase control filter 18. The timing phase judging section 36 is constructed by a phase rotating section 130, a region judging section 132, and a judgement information forming section 134.

The reason why the timing phase is judged and controlled so as to have the optimum phase will now be described as follows. First, in case of using an automatic equalizer of the double sampling type, as shown in FIG. 2, there is a relation of $$f=2f_B$$

between a sampling frequency f and a baud rate frequency $f_B$. In this case, the sampling theorem is satisfied and there is no overlap on the frequency spectrum. Therefore, a level fluctuation depending on the timing phase doesn't occur between two signals due to the overlap of the spectrum. On the other hand, in case of using an automatic equalizer of the single sampling type, as shown in FIG. 3, there is a relation of $$f=f_B$$

between the sampling frequency f and the baud rate frequency $f_B$. In this case, the sampling theorem is not satisfied.

Therefore, in case of the single sampling type automatic equalizer, an overlap on the frequency spectrum occurs. In the case where the overlap on the frequency spectrum occurs, a variation occurs in the level of the reception signal due to the timing phase. For instance, when considering an overlap of two tone signals, they are enhanced when a phase difference is equal to 0°. When the phase difference is equal to 180°, they are set off and becomes zero. Therefore, in the case where the timing phase is worst, an infinite gain is required for the automatic equalizer and the performance of the equalizer deteriorates.

Therefore, with respect to the automatic equalizer of the single sampling type, as shown in FIG. 1, the timing phase judging section 36 is provided, the timing phase of the reception vector signal is judged, and tap coefficients are feedback controlled by the phase control filter 18 so as to obtain the optimum phase.

FIG. 4 is a flowchart showing a conventional timing phase judging process. For example, as shown in FIG. 5, the phase plane is divided into sixteen phase regions every angle of 22.5°, thereby judging region numbers 1 to 16 to which the reception vector signal belongs. First, in step S1, the real component x and the imaginary component y of the input vector signal are sampled. In step S2, a quadrant is discriminated to see if the vector signal belongs to either one of the first to fourth quadrants. In steps S3, S5, S7, and S9, the processing routine advances to either one of steps S4, S6, S8, and S10 in accordance with the result of the quadrant judgement in step S2. The number N of regions which are necessary to rotate the vector signal to the first quadrant. In this case, since the phase plane is divided into 16 regions every 22.5°, First quadrant: N=0 (not rotate)
Second quadrant: N=4 (22.5°×4=90° rotation)
Third quadrant: N=8 (22.5°×8=180° rotation)
Fourth quadrant: N=12 (22.5°×12=270° rotation)

In the next step S11, the vector is moved to the first quadrant by calculating the absolute value of the real component x and the imaginary component y. Phase judging processes in steps S12, S14, and S16 are executed. In the phase judging process, when it is now assumed that the real component after the vector was moved to the first quadrant is set to X and the imaginary component is set to Y, in the case where the region into which the vector was moved belongs to the region No. 1, namely, when a phase angle θ of the vector moved to the first quadrant lies within a range of $$0° \leq \theta \leq 22.5°,$$

$$Y/X = \tan \theta \leq \tan 22.5° = 0.414213562$$

$$Y - 0.414213562 \cdot X \leq 0$$

On the other hand, when the phase angle θ lies within a range of $$22.5° \leq \theta \leq 90°,$$

$$Y/X = \tan \theta > \tan 22.5° = 0.414213562$$

$$Y - 0.414213562 \cdot X > 0$$

Therefore, by the sign of $$(Y - 0.414213562 \cdot X),$$

it is possible to judge whether the region belongs to the region No. 1 or not. Such a phase judging process is the process in step S12. In step S12, (Y−0.414·X) is simply shown as an abbreviation.

Similarly, in step S14, a check is made to see if the region belongs to the region No. 2 of the first quadrant or not. In step S16, a check is made to see if the region belongs to the region No. 3 or not. The results of the phase judgements in steps S12, S14, and S16 are obtained as judgement region numbers $N_0$=1 to 4 in steps S13, S15, S17, and S18. Finally, in step S19, the region No. $N_0$ obtained in either one of the steps S13, S15, S17, and S18 is added to the number N of regions which are necessary to the rotation to the first quadrant obtained in either one of the steps S4, S6, S8, and S10, so that the region number N to which the vector signal actually belongs can be calculated. For example, in case of the input vector signal of the phase angle of 240°, as a result of the quadrant judgment in step S2, the processing routine advances to step S7 and the third quadrant is discriminated and N=8 is obtained. Due to the movement to the first quadrant, the condition in step S16 is satisfied. Step S17 follows and $N_0$=3 is obtained. Finally, in step S19, $$N=N+N_0=3+8=11$$

is obtained and the judgement result of the timing phase is obtained as region number N=11.

However, in such a conventional timing phase judgment, in the case where the dividing number of the phase plane shown in FIG. 5 is increased in accordance with the nth power (n is a natural number) of 2 in order to raise a judgment precision of the timing phase, there are problems such that the region data which is used for the comparison judgment of the timing phase increases and a data amount in the ROM increases and the processing time becomes long. For instance, when it is now assumed that the region was divided into 128 regions in order to improve the judgement precision as compared with the 16 divided regions in FIG. 4, the region is divided every 2.28125°. Since the number of divided regions of the first quadrant is equal to 32, 31 kinds of coefficients K of (Y−K·X) indicative of the phase angle of one phase region in the first quadrant are needed. The ROM amount increases. To judge 32 regions, the comparing processes of 31 times are necessary in the longest case. There is a problem such that the processing time also becomes long and a hardware of a high-speed DSP and the like must be prepared.

SUMMARY OF THE INVENTION

According to the invention, there are provided method and apparatus for judging a timing phase of a modem which is used in data communication, in which even when the number of dividing regions of a phase plane is increased in order to raise a phase judgment precision, a processing amount and a hardware amount don't change, and an arbitrary judgment precision can be realized in accordance with the necessity.

First, the invention relates to a modem for a data communication, in which a vector signal (x+jy) having a real component (x) and an imaginary component (y) is demodulated from a line reception signal, a data signal point on a phase plane is judged, and transmission data is reconstructed from the data signal point.

The timing phase judging apparatus of the invention has a quadrant judging section, a rotational vector generating section, and an offset generating section. The quadrant judging section inputs a sampled vector signal (x+jy) and judges the quadrant of the phase plane to which the vector signal belongs. The rotational vector generating section generates a rotational vector signal (a+jb) to rotate the vector signal (x+jy) into the first quadrant on the basis of the result of the judgment of the quadrant Judging section. The offset generating section generates an offset phase angle $\theta_2$ to return the input vector signal which was rotated into the first quadrant on the basis of the result of the judgement of the quadrant judging section. The rotational vector generating section and offset generating section are practically prepared as an ROM table. Values stored in the ROM table don't depend on the dividing number of the phase plane but values which have previously been prepared are fixedly used.

Further, a timing phase judging apparatus of the invention comprises a first quadrant converting section, a judgment phase calculating section, and a judgement phase information forming section. The first quadrant converting section multiplies the rotational vector signal (a+jb) from the rotational vector generating section to the input vector signal (x+jy) and converts into the vector signal (X+jY) of the first quadrant. The judgment phase calculating section detects a phase rotational angle $\theta_1$ in the first quadrant of the vector signal (X+jY) which was rotated into the first quadrant and adds the offset phase angle $\theta_2$ generated from the offset generating section to the phase angle $\theta_1$, thereby calculating the phase rotational angle $\theta$ at the phase plane from the first quadrant to the fourth quadrant at which the input vector signal is actually located. The judgment phase information forming section divides the phase plane into a plurality of regions every predetermined angle and forms and generates the phase judgment information indicative of the region to which the phase rotational angle $\theta$ obtained by the judgment phase calculating section belongs.

In dependence on the performance of a digital signal processor which is used in a data modem, in the case where the phase angle $\theta$ of all of the quadrants of the phase plane is handled as a continuous amount in a numerical value range of 0 to +N of $0 \leq \theta \leq \pi$ and is handled as a continuous amount in a numerical value range of −N to 0 of $\pi \leq \theta \leq 290$ (where, N is an integer of 1, 2, 3, . . . ), the rotational vector generating section generates the values of the real component (a) and the imaginary component (b) of the rotational vector (a+jb) as follows.

In the first quadrant, a=+0.5N, b=0.00

In the second quadrant, a=0.00, b=−0.5N

In the third quadrant, a=−0.5N, b=0.00

In the fourth quadrant, a=0.00, b=+0.5N

On the other hand, the offset generating section generates the numerical values indicative of the offset phase angle $\theta_2$ as follows.

In the first quadrant, $\theta_2$=+0.25N

In the second quadrant, $\theta_2$=+0.75N

In the third quadrant, $\theta_2$=−0.75N

In the fourth quadrant, $\theta_2$=−0.25N

Specifically speaking, in dependence on the performance of the digital signal processor which is used in the data modem, the phase angle $\theta$ of all of the quadrants of the phase plane is handled as a continuous amount in a numerical value range of 0 to +2 of $0 \leq \theta \leq \pi$ and is also handled as a continuous amount in a numerical value range of −2 to 0 of $\pi \leq \theta \leq 2\pi$. Therefore, the rotational vector generating section generates the values of the real component (a) and the imaginary component (b) of the rotational vector (a+jb) as follows.

In the first quadrant, a=+1.00, b=0.00

In the second quadrant, a=0.00, b=−1.00

In the third quadrant, a=−1.00, b=0.00

In the fourth quadrant, a=0.00, b=+1.00

The offset generating section generates the numerical values indicative of the offset phase angle $\theta_2$ as follows.

In the first quadrant, $\theta_2$=+0.5

In the second quadrant, $\theta_2$=+1.5

In the third quadrant, $\theta_2$=−1.5

In the fourth quadrant, $\theta_2$=−0.5

The first quadrant converting section multiplies the rotational vector (a+jb) to the input vector signal (x+jy), thereby obtaining the vector signal (X+jY) which was moved into the first quadrant. Subsequently, the judgment phase calculating section multiplies a predetermined coefficient K to the value (Y−X) which is obtained by subtracting the real component X from the imaginary component Y of the vector signal which was moved into the first quadrant and obtains the result as a numerical value $$\theta_1=(Y-X)\cdot K$$

indicative of the phase angle $\theta_1$ in the first quadrant.

Further, the offset generating section adds a numerical value (c) indicative of the offset phase angle $\theta_2$ to the phase angle $\theta_1$ of the first quadrant, thereby obtaining the original phase angle $\theta$.

That is, $$\theta=\theta_1+\theta_2=(Y-X)\cdot K+c$$

is obtained. In the case where a phase angle 0 to $2\pi$ of all of the quadrants of the phase plane is handled as a continuous amount in a numerical value range of +N to −N, K=0.25N and K=0.5 in a numerical value range of +2 to −2. Therefore, $$\theta=\theta_1+\theta_2=(Y-X)\cdot 0.5+c$$

is obtained.

A precision of the phase judgment is raised by executing a rounding process to the numerical value of the phase angle $\theta$ obtained by the judgment phase calculating section. A limiter section to limit the numerical value of the judgment phase angle $\theta$ obtained by the judgment phase calculating section into a specific range is provided. The limiter section clips to the upper limit value +2 when the numerical value of the phase angle $\theta$, for example, is larger than the upper limit value +2 and clips to the lower limit value −2 when the numerical value of the phase angle $\theta$ is smaller than the lower limit value −2 and handles the judgment phase as a continuous amount in a numerical range of +2 to −2. The judgment phase information output section divides the phase plane into the regions of the nth power of 2 and forms the bit information indicative of the region to which the phase angle $\theta$ belongs.

In the timing phase judgment of the invention, for example, in the case where the phase angle $\theta$ of all of the quadrants of the phase plane is handled as a continuous amount in a numerical value range of 0 to +2 of $0\leq\theta\leq\pi$ and is handled as a continuous amount in a numerical value range of −2 to 0 of $\pi\leq\theta\leq 2\pi$, the rotational vector (a+jb) is multiplied to the input vector signal (x+jy), thereby converting into the vector (X+jY) in the first quadrant. By using the real component X and imaginary component Y of such a vector, the phase angle $\theta_1$ in the first quadrant is obtained as $$\theta_1=(Y-X)\cdot 0.5N$$

Finally, by adding the offset phase angle $\theta_2$=c, $$\theta=\theta_1+\theta_2=(Y-X)\cdot 0.5+c$$

is obtained and the region information indicative of the timing phase angle can be formed.

The invention also provides a simple type timing phase judging apparatus. In this case, as a prerequisite, the relational equation $$\{-(xa-yb)+(ya+yb)\}\cdot K=Ax+By$$

indicative of the phase angle $\theta_1$ of the vector signal (X+jY) which was rotated into the first quadrant by multiplying the rotational vector (a+jb) to the input vector signal (x+jy) is defined.

In case of the simple type, a coefficient generating section, an offset generating section, a polarity judging section, and a judgment phase calculating section are provided. The coefficient generating section generates the values of coefficients A and B indicative of the phase angle $\theta_1$ in correspondence to the polarity of each of the real component x and imaginary component y of the input vector signal (x+jy). The offset generating section generates a real component offset value $c_1$ and an imaginary component offset value $c_2$ indicative of the offset phase angle $\theta_2$ to return the vector signal (X+jY) which was rotated into the first quadrant to the original signal in correspondence to the polarity of each of the real component x and imaginary component y of the input vector signal. The polarity judging section judges the polarities of the real component x and imaginary component y of the input vector signal. The judgement phase calculating section obtains the numerical value (Ax+By) indicative of the phase angle $\theta_1$ when the input vector signal was rotated into the first quadrant on the basis of the coefficients A and B generated from the coefficient generating section in accordance with the polarities judged in the polarity judging section and adds the offset value (c) indicative of the offset phase angle $\theta_2$ generated from the offset generating section to the numerical value (Ax+By) in accordance with the polarities judged in the polarity judging section, thereby obtaining the judgment phase angle $\theta$ of the vector signal.

In the case where the phase angle $\theta$ of all of the quadrants of the phase plane is handled as a continuous amount in a numerical value range of 0 to +N of $0\leq\theta\leq\pi$ and is also handled as a continuous amount in a numerical value range of −N to 0 of $\pi\leq\theta\leq 2\pi$ (where, N is an integer of 1, 2, 3, . . . ), the coefficient generating section generates the following values as coefficients B and A when x=positive, B=+0.25N when x=negative, B=−0.25N when y=positive, A=−0.25N when y=negative, A=+0.25N On the other hand, the offset generating section generates the following values while assuming the offset values are set to $c_1$ and $c_2$ for the polarities of the real component x and imaginary component y of the input vector signal, when x=positive, $c_1$=+0.25N when x=negative, $c_1$=+0.75N when y=positive, $c_2$=+0.50N when y=negative, $c_2$=−0.50N The numerical value (c) indicative of the offset phase angle $\theta_2$ is obtained by multiplying offset values $c_1$ and $c_2$.

In such a simple type, the relational equation showing the phase angle $\theta_1$ of the vector signal (X+jY) which was rotated into the first quadrant by multiplying the rotational vector (a+jb) to the input vector signal (x+jy)

$$\}-(xa-yb)+(ya+yb)\}\cdot 0.5 = Ax + By$$

is defined. The coefficients A and B are generated as table data according to the polarities of the real component x and imaginary component y. Thus, the vector rotation into the first quadrant and the calculation of the phase angle $\theta_1$ in the first quadrant can be realized by the one reading operation form the table. Since the polarities are judged, as compared with the quadrant judgment which needs the judgment three times, it is sufficient to execute the judgment two times in which the number of judging times is less than the above judgment by one time. The processes are further simplified.

The above and other objects, features, and advantages of the present invention will become more apparent from the following detailed description with reference to the drawings.

BRIEF DESCRIPTION OF THE DRAWINGS

FIG. 11 is an explanatory diagram showing the correspondence between the judgment sensitivity and the timing phase information for the phase number of the first quadrant;

FIG. 12 is an explanatory diagram showing the correspondence between the judgment sensitivity and the timing phase information for the phase number of the second quadrant;

FIG. 13 is an explanatory diagram showing the correspondence between the judgment sensitivity and the timing phase information for the phase number of the third quadrant;

FIG. 14 is an explanatory diagram showing the correspondence between the judgment sensitivity and the timing phase information for the phase number of the fourth quadrant;

FIG. 25 is an explanatory diagram of a high-order tap coefficient ROM which is accessed by the timing phase information D1;

FIG. 26 is an explanatory diagram of a low-order tap coefficient ROM which is accessed by the timing phase information D2;

FIG. 32 is an explanatory diagram showing the meanings of the coefficients which are used in the second embodiment by a table form;

DETAILED DESCRIPTION OF THE PREFERRED EMBODIMENTS

Figure 6:
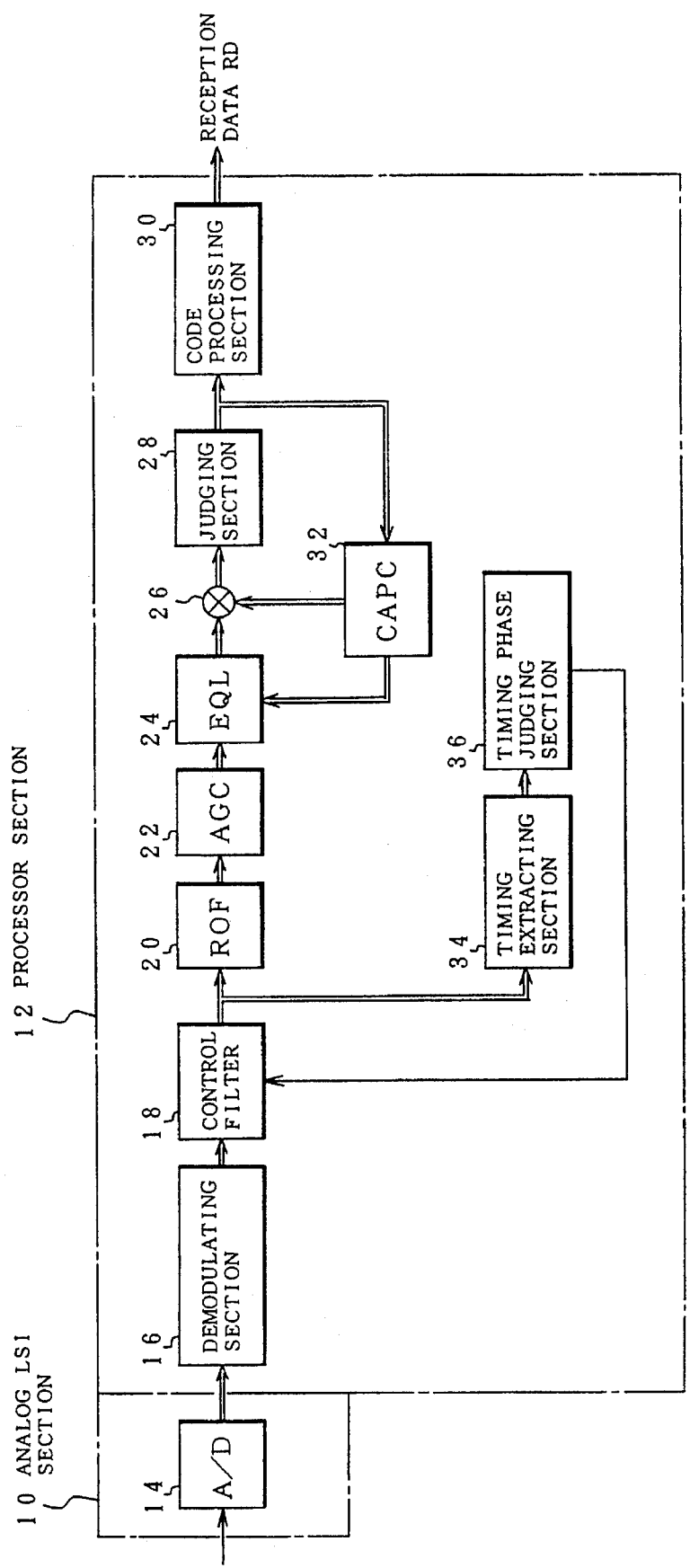
FIG. 6 is a block diagram of a modem receiving section to which the invention is applied.

FIG. 6 shows an embodiment of a data modem to which a timing phase judging apparatus of the invention is applied. The data modem is constructed by an analog LSI section 10 and a processor section 12 using a digital signal processor and an MPU. An A/D converter 14 is provided in the analog LSI section 10 and samples a reception signal from a line by a sampling frequency f that is equal to a baud rate frequency $f_B$. In the A/D converter 14, since the sampling frequency f is equal to the baud rate frequency $f_B$ of the data modem, a single sampling type automatic equalizer is used. Therefore, it is necessary to judge the timing phase and to control the phase to the optimum phase.

The processor section 12 comprises: the demodulating section 16; the control filter 18 which is subjected to the control of tap coefficients so as to obtain the optimum phase; the roll-off filter 20; the AGC circuit 22; the single sampling type automatic equalizer (EQL) 24; a multiplier 26; a judging section 28; a code processing section 30; and a carrier automatic phase control section (CAPC) 32. The functions of the circuit sections provided in the processor section 12 will now be briefly explained. In the demodulating section 16, a vector signal having the real component x and imaginary component y at a phase plane is demodulated from the digital data which was sampled by the A/D converter 14. As will be obviously explained hereinlater, the control filter 18 performs the control to obtain the optimum phase by the control of the tap coefficients based on the result of the judgment of the timing phase. The roll-off filter section 20 executes a waveform shaping and a band limitation. The AGC section 22 automatically gain controls a magnitude of the vector signal so as to obtain a radius 1 of a reference circle. The automatic equalizer 24 performs the automatic equalization in a frequency band to compensate a line deterioration. The judging section 28 judges a correct data signal point by a maximum likelihood method according to a Viterbi algorithm in the case where, for example, a trellis encoding was performed on the transmission side. The code processing section 30 forms a bit train corresponding to the data signal point judged and generates as reception data RD in parallel at every frame period. The carrier automatic phase control section 32 compensates a jitter occurring on the line or a fluctuation of the phase by the feedback to the automatic equalizer 24 and the multiplication by the multiplier 26 on the basis of the result of the judgment of the judging section 28. An output of the control filter 18 to the roll-off filter section 20 is branched and given to the timing extracting section 34. A vector signal having the real component x and the imaginary component y at a predetermined timing is extracted by the timing extracting section 34 and supplied to the timing phase judging section 36. The timing phase judging section 36 divides the phase plane to judge the timing phase into N regions. For instance, in the embodiment, N=128. The phase number indicative of the divided region to which the input vector signal belongs is supplied to the control filter 18 as timing phase judgment information. By receiving the result of the judgment from the timing phase judging section 36, the control filter 18 sets a predetermined tap coefficient in correspondence to the phase number of the divided region which was judged and controls the input vector signal to the automatic equalizer 24 so as to obtain the optimum phase, thereby minimizing the influence by the overlap on the frequency spectrum.

Figure 7:
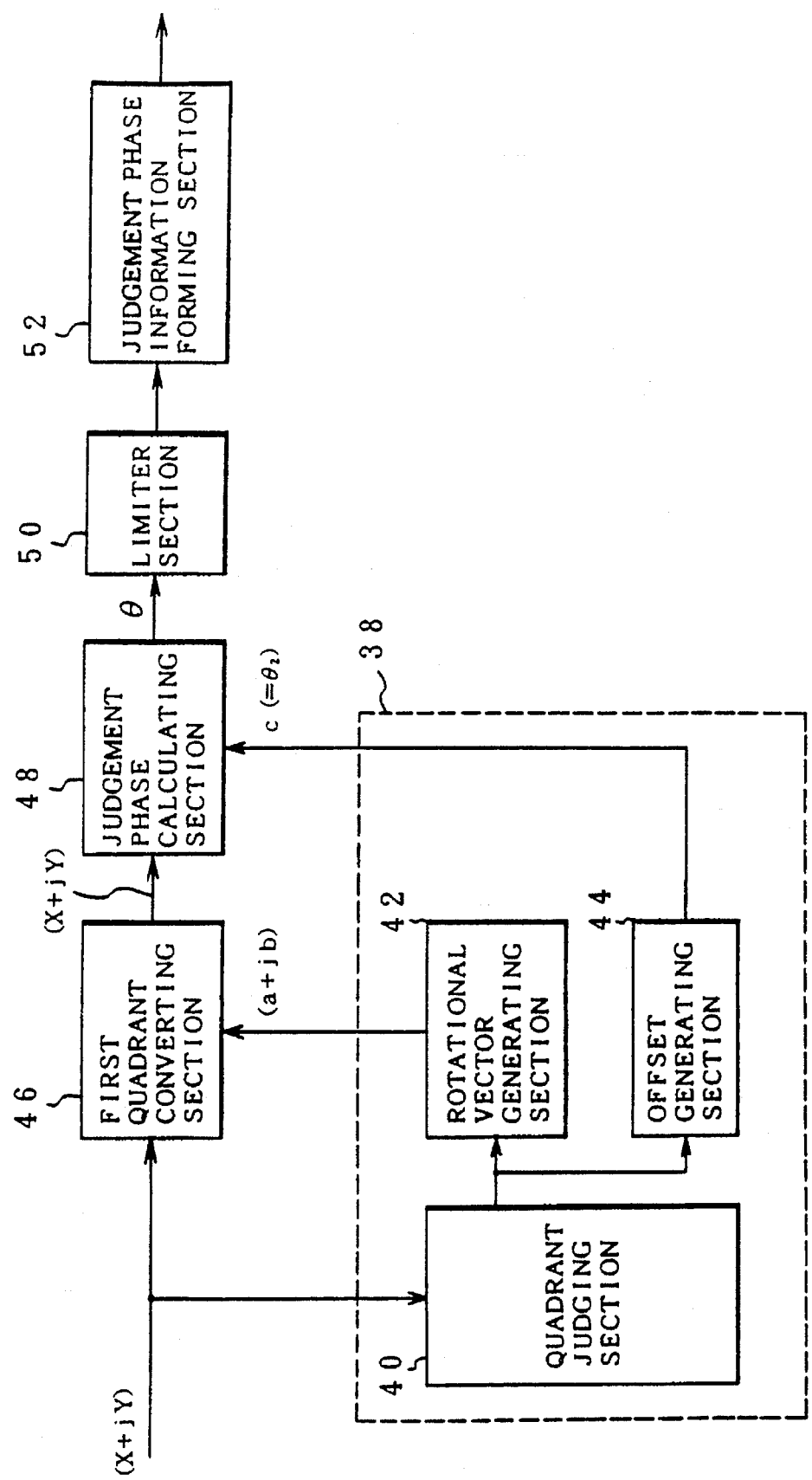
FIG. 7 is a block diagram showing the first embodiment of the invention.

FIG. 7 shows the first embodiment of the timing phase judging section 36 provided in the processor section 12 in FIG. 6. The timing phase judging section according to the first embodiment comprises: a judgment control section 38; a first quadrant converting section 46; a judgment phase calculating section 48; a limiter section 50; and a judgment phase information forming section 52. The judgment control section 38 has a quadrant judging section 40, a rotational vector generating section 42, and an offset generating section 44.

Figure 8:
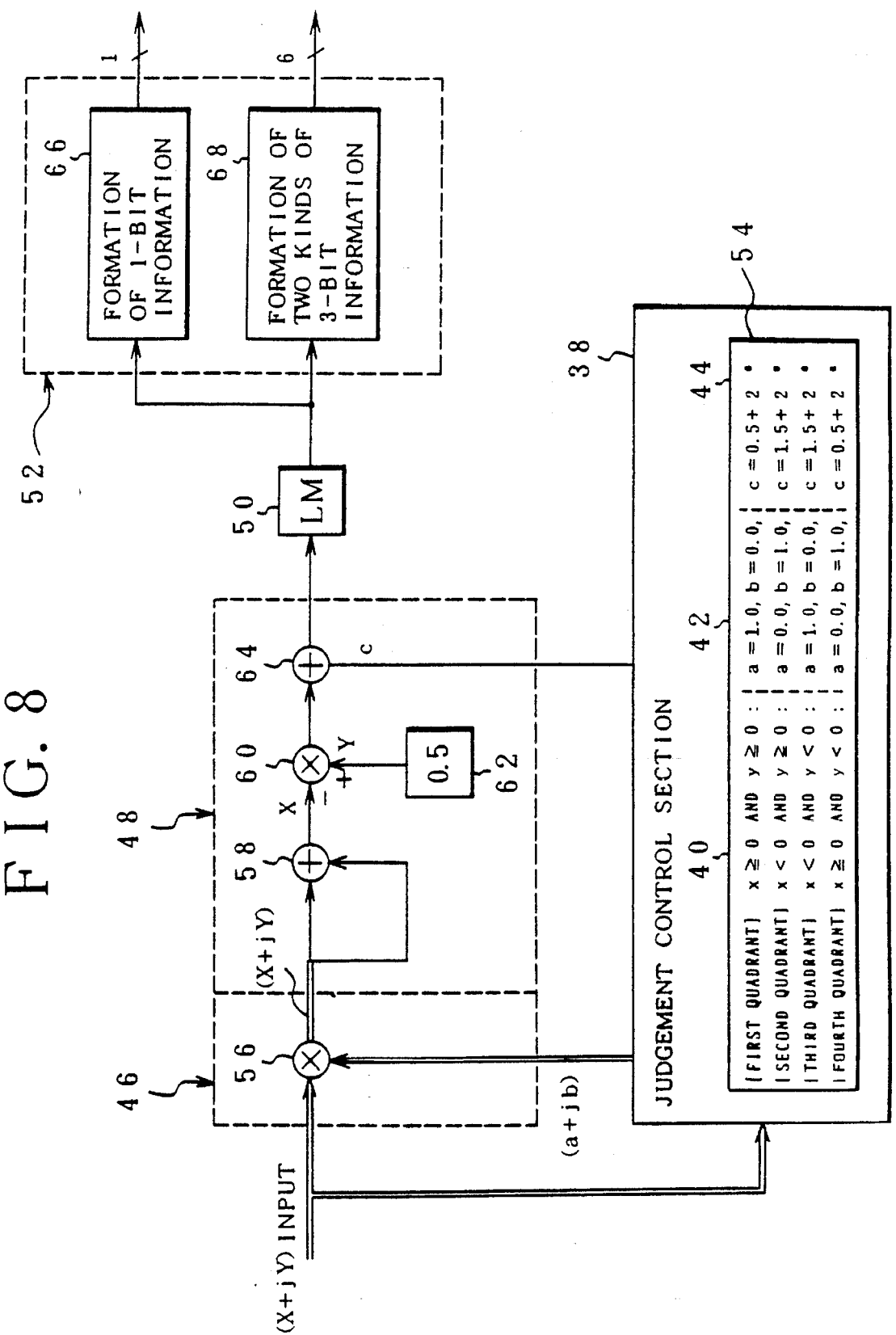
FIG. 8 is a block diagram showing the details of FIG. 7.

FIG. 8 shows the case where the embodiment of FIG. 7 is realized by an arithmetic operating function by the digital signal processor. First, with respect to the numerical value expression of the phase angle θ of all of the quadrants of the phase plane by the arithmetic operating function of the digital signal processor, generally, it is handled as a continuous amount in a numerical value range of 0 to +N with regard to $0 \leq \theta \leq \pi$ and is handled as a continuous amount in a numerical value range of −N to 0 with regard to $\pi \leq \theta \leq 2\pi$.

In the digital signal processor of the embodiment, N=2. Therefore, the phase angle θ is handled as a continuous amount in a numerical value range of 0 to +2 with regard to $0 \leq \theta \leq \pi$ and is handled as a continuous amount in a numerical value range of −2 to 0 with regard to $\pi \leq \theta \leq 2\pi$.

In FIG. 8, an ROM table 54 is first provided in the judgment control section 38. By the ROM table 54, the quadrant judging section 40, rotational vector generating section 42, and offset generating section 44 shown in FIG. 7 are realized. The ROM table 54 has: a storage area as a rotational vector generating section 42 in which coefficients a and b of the rotational vector signal (a+ jb) have been stored by using the result of the judgment by the quadrant judging section 40 as an address; and a storage area as an offset generating section 44 in which the offset phase angle c ($=\theta_2$) has been stored similarly in correspondence to the judged quadrant. The value c of the offset phase angle $\theta_2$ stored in the storing area as an offset generating section 44 is further stored as a value to which a weight "$2^{-6}$" to execute a rounding process was added. In the quadrant judgment of the input vector signal (x+jy) in the quadrant judging section 40 provided in the judgment control section 38, as shown in the ROM table 54, by discriminating the polarities of the real component x and imaginary component y, it is possible to judge whether the value belongs to which one of the first to fourth quadrants. The first quadrant converting section 46 has a multiplier 56. The rotational vector (a+jb) based on the coefficients (a) and (b) read out from the storage area of the rotational vector generating section 42 of the judgment control section 38 is multiplied to the input vector signal (x+jy), thereby converting the input vector signal (x+jy) into the vector signal (X+jY) of the first quadrant. In the judgment phase calculating section 48, the result of the judgment regarding to which one of the N=128 divided regions the input vector signal belongs is directly realized by the numerical value arithmetic operation in a range of +2 to −2.

Figure 9:
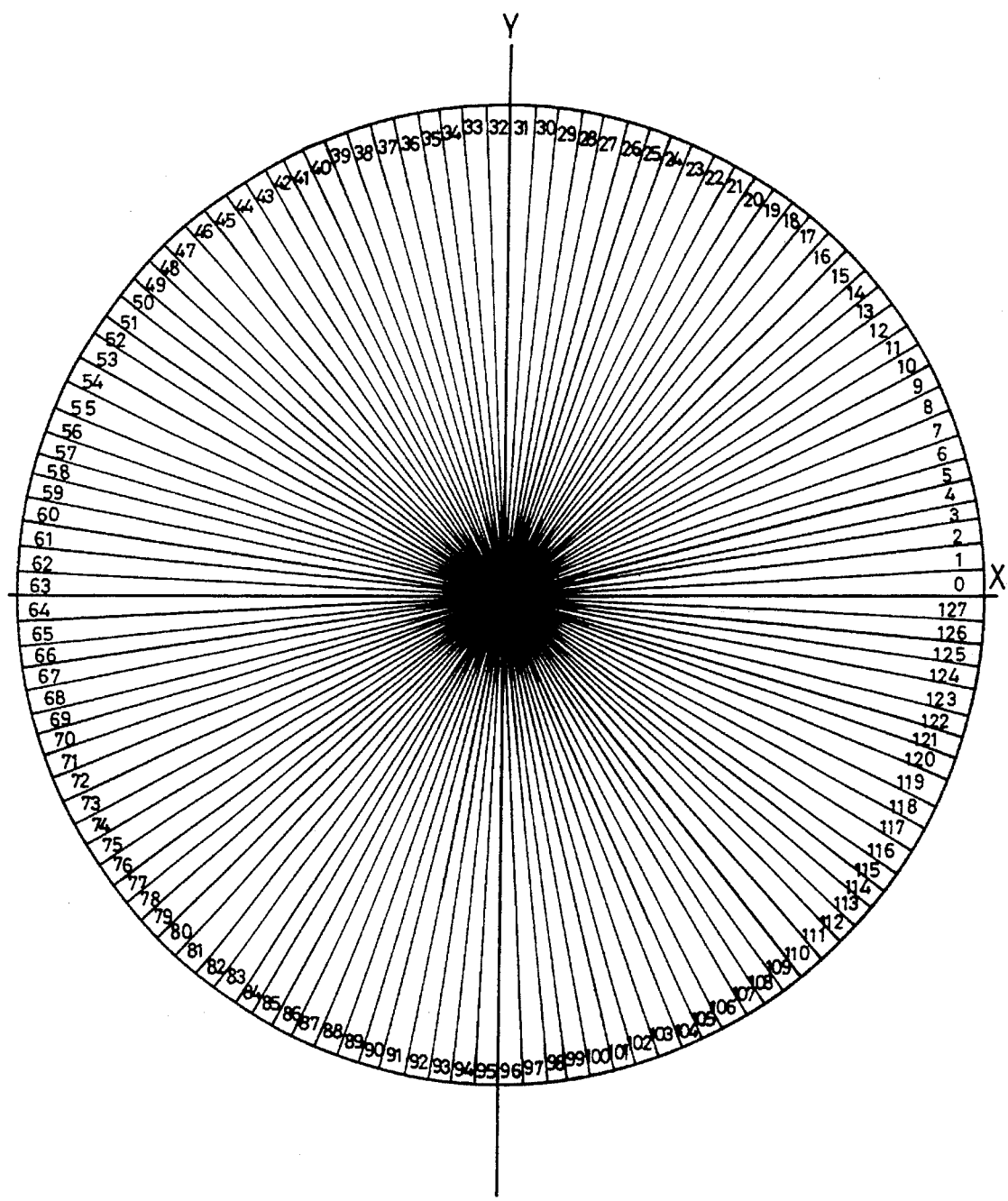
FIG. 9 is an explanatory diagram of 128 divided phase regions.

Further explaining in detail, FIG. 9 shows a state in which the phase plane is divided into N=128 regions. The phase numbers 0, 1, 2, ..., 127 are sequentially allocated to the divided regions from the first quadrant to the fourth quadrant in accordance with the order. When the phase plane is divided into N=128 regions, a phase angle Δθ per one divided region is $$\Delta\theta = 2.8125°$$

The phase angle θ=2.8125° of one divided region is expressed by the following numerical value expression.

$$\Delta\theta = 0.015625$$

Figure 10:
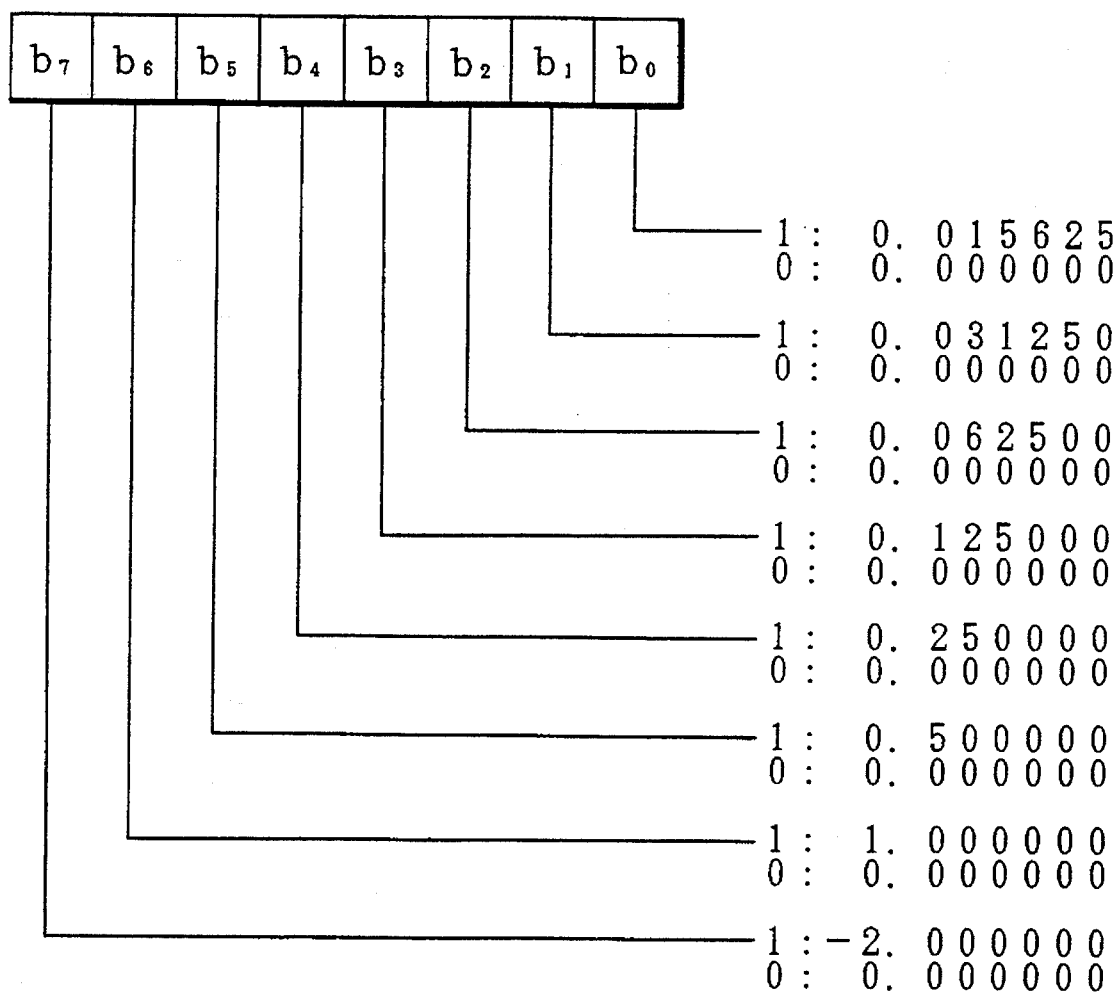
FIG. 10 is an explanatory diagram of bit information showing a timing phase.

FIG. 10 shows a fundamental format of byte data of a digital signal processor to realize the timing phase judging process of the invention. The byte data is constructed by eight bits. In case of the N=128 division, the phase angle Δθ=2.8125 of one divided region can be expressed by the numerical value expression Δθ=0.015625. Therefore, the value of Δθ is used as a minimum unit and a weighing process by the numerical value indicative of the phase angle is executed as shown in bits $b_0$ to $b_6$ in FIG. 10. The most significant bit $b_7$ is a code bit indicative of the positive or negative sign of the numerical value.

FIGS. 11, 12, 13, and 14 show correspondence relations between the judgment angle θ and the bit data calculated by the judgment phase calculating section 48 for the phase numbers of the divided regions of the phase plane which was divided into N=128 regions as shown in FIG. 9. That is, FIG. 11 shows the first quadrant. FIG. 12 shows the second quadrant. FIG. 13 shows the third quadrant. FIG. 14 shows the fourth quadrant. Lower six bits of the bit data in the first and second quadrants in FIGS. 11 and 12 are the same as lower six bits of the third and fourth quadrants in FIGS. 13 and 14. Only the most significant bits are different, namely, the most significant bits regarding the first and second quadrants are set to 0, and the most significant bits of the third and fourth quadrants are set to 1.

Referring again to FIG. 8, the judgment phase calculating section 48 executes arithmetic operations for obtaining the phase angle $\theta_1$ in the first quadrant from the vector signal (X+jY) which was rotated into the first quadrant by the first quadrant converting section 46 and for adding the offset phase angle $\theta_2$ to return to the original phase angle to the phase angle $\theta_1$. That is, the phase angle $$\theta_1 = (Y-X) \times K \qquad (1)$$

in the first quadrant is calculated. Since the numerical value range of −0.5 to +0.5 corresponds to $0 \leq \theta_1 \leq \pi/2$, the coefficient K in the equation (1) is equal to K=0.5. Therefore, the phase angle $\theta_1$ of the first quadrant can be calculated by $$\theta_1 = (Y-X) \times 0.5 \qquad (2)$$

When the phase angle $\theta_1$ in the quadrant of the vector (X+jY) which was moved to the first quadrant is obtained, the offset phase angle $\theta_2$ is added in order to return the phase angle $\theta_1$ to the original angle.

Figure 15A:
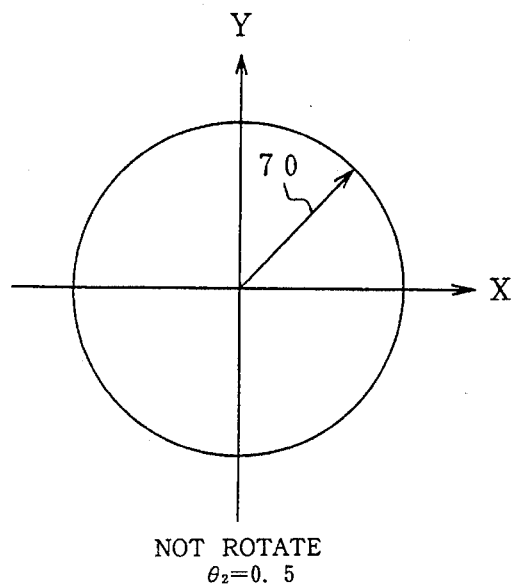
FIGS. 15A to 15D are explanatory diagrams showing the vector rotation into the first quadrant and the offset phase angles which are returned to the original angles.

FIGS. 15A to 15D show states in which the vectors locating in the first to fourth quadrants were respectively rotates into the first quadrant. FIG. 15A shows the case where an input vector signal 70 exists in the first quadrant. In this case, since the rotation is unnecessary, the coefficients (a) and (b) of the rotational vector are set to 1.0 and 0.0 as shown in the ROM table 54 in FIG. 8. The phase angle $\theta_1$ of the vector signal 70 existing in the first quadrant is obtained by the equation (2) and lies within a numerical value range of −0.5 to +0.5 for 0 to $\pi/2$. Since the phase angle $\theta_1$ of the first quadrant is finally converted into the numerical value expression of 0 to +1 by 0 to $\pi/2$ shown in FIG. 16, the offset phase angle $\theta_2$=0.5 is added and as a value in which the rounding process was further performed to the numerical value indicative of the offset phase angle $\theta_2$, $c=0.5+2^{-6}$ is stored into the ROM table 54 in FIG. 8.

Figure 15B:
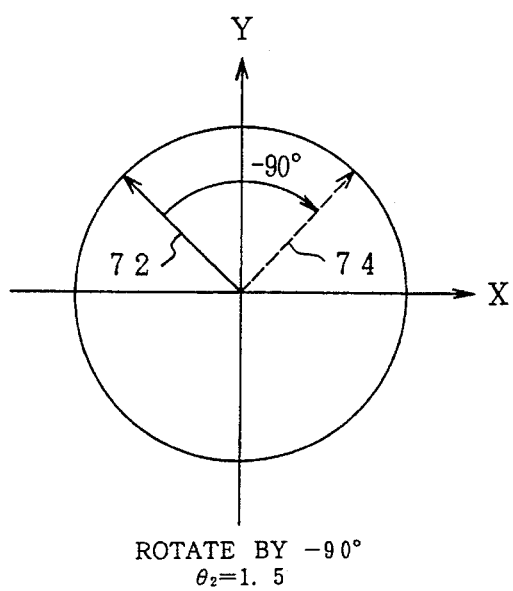

FIG. 15B shows a state in which an input vector signal 72 existing in the second quadrant was rotated into a vector signal 74 in the first quadrant. In this case, when the vector signal 72 is rotated by −90°, the vector signal 74 of the first quadrant is obtained. The phase angle $\theta_1$ in the quadrant of the vector signal which was rotated into the first quadrant is calculated by the equation (2). The offset phase angle $\theta_2$ to return to the original vector signal 72 is equal to $\theta_2=1.5$ because a range of $\pi/2$ to $\pi$ of the second quadrant corresponds to the numerical value expression of +1 to +2. With respect to the second quadrant of the ROM table 54 in FIG. 8, $c=1.5+2^{-6}$ in which $2^{-6}$ for the rounding process was added to the offset angle $\theta_2=1.5$ has previously been stored.

Figure 15C:
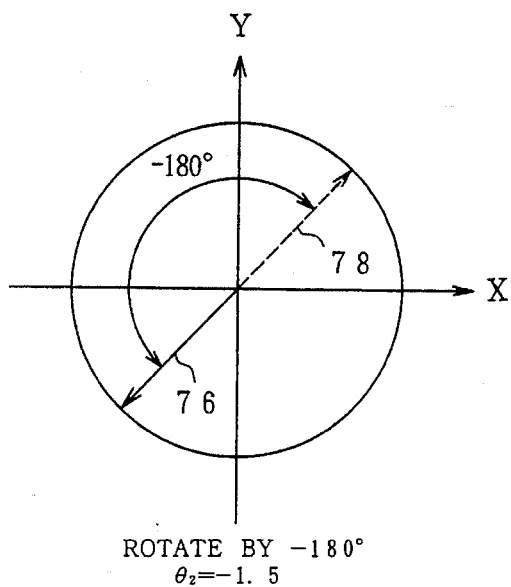
Figure 15D:
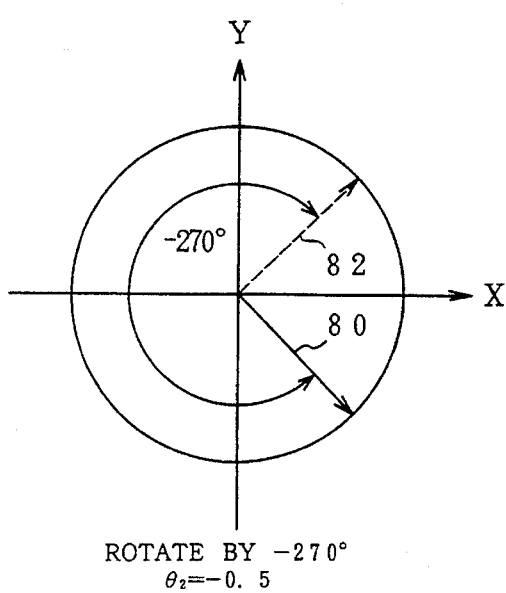

FIG. 15C shows a state of the rotation to a vector signal 78 of the first quadrant in the case where an input vector signal 76 exists in the third quadrant. In this case, the signal is rotated by −180° and the offset phase angle $\theta_2$ to return the phase angle $\theta_1$ in the first quadrant to the original vector signal 76 is equal to $\theta_2=-1.5$. Actually, $c=-1.5+2^{-6}$ in which the rounding process was performed to the position in the third quadrant of the ROM table 54 in FIG. 8 is stored.

Figure 1:
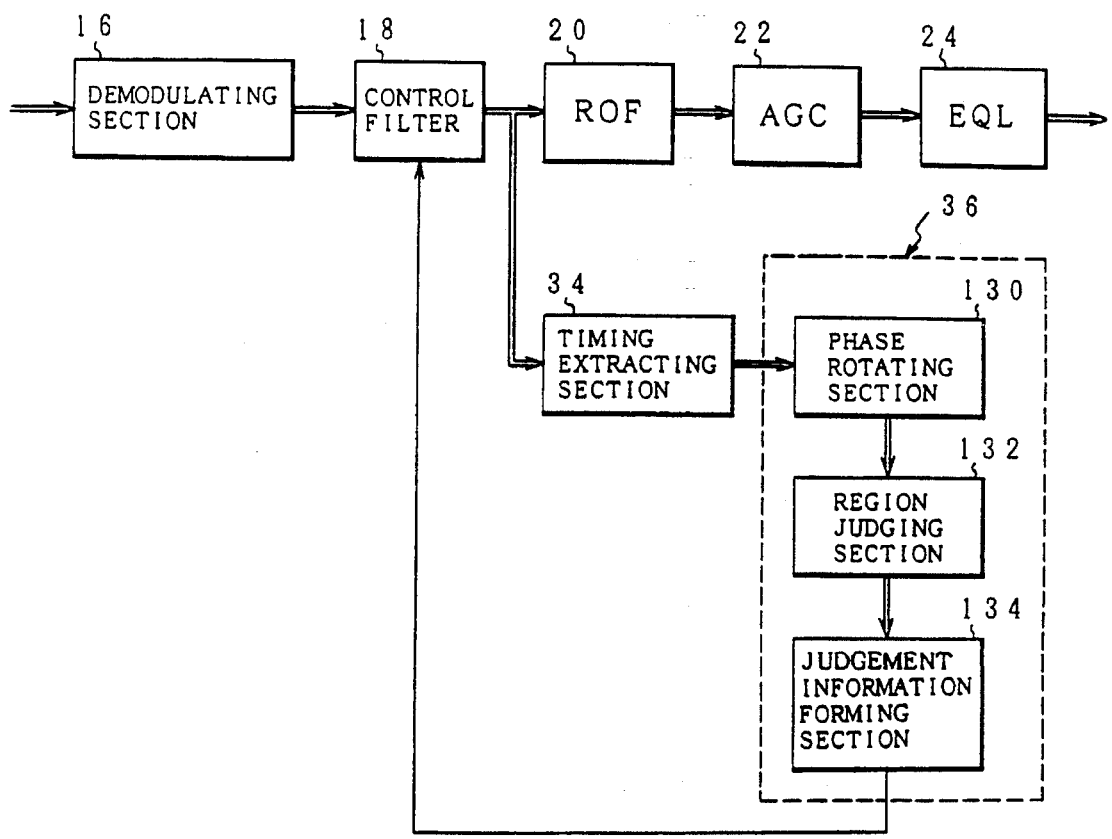
FIG. 1 is a block diagram of a conventional modem receiving section having a timing phase judging function.
Figure 2:
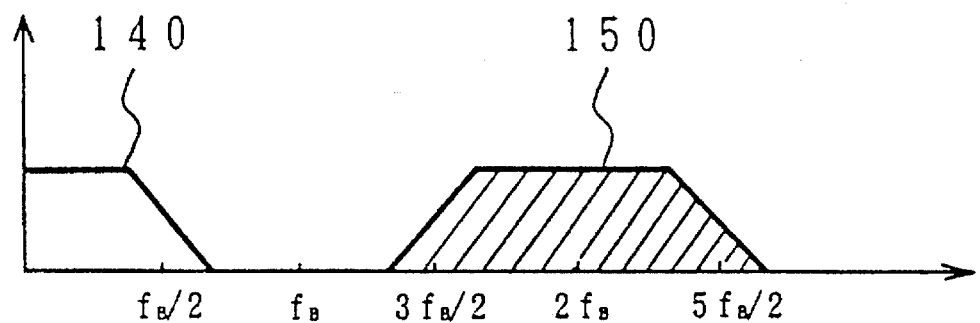
FIG. 2 is an explanatory diagram showing a frequency spectrum in a double sampling type automatic equalizer.
Figure 3:
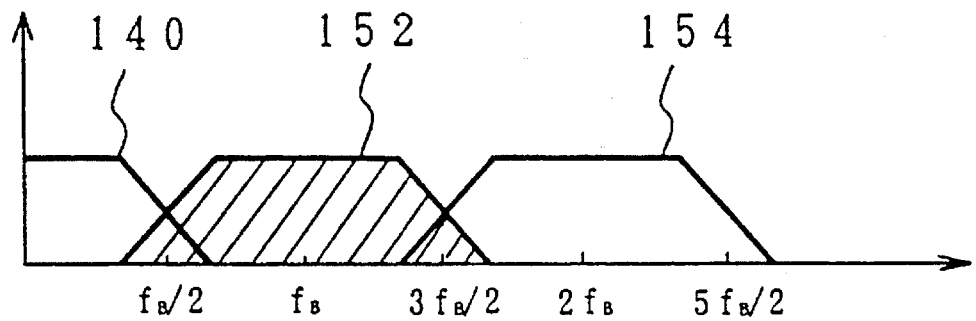
FIG. 3 is an explanatory diagram showing overlaps on a frequency spectrum in a single sampling type automatic equalizer.
Figure 4:
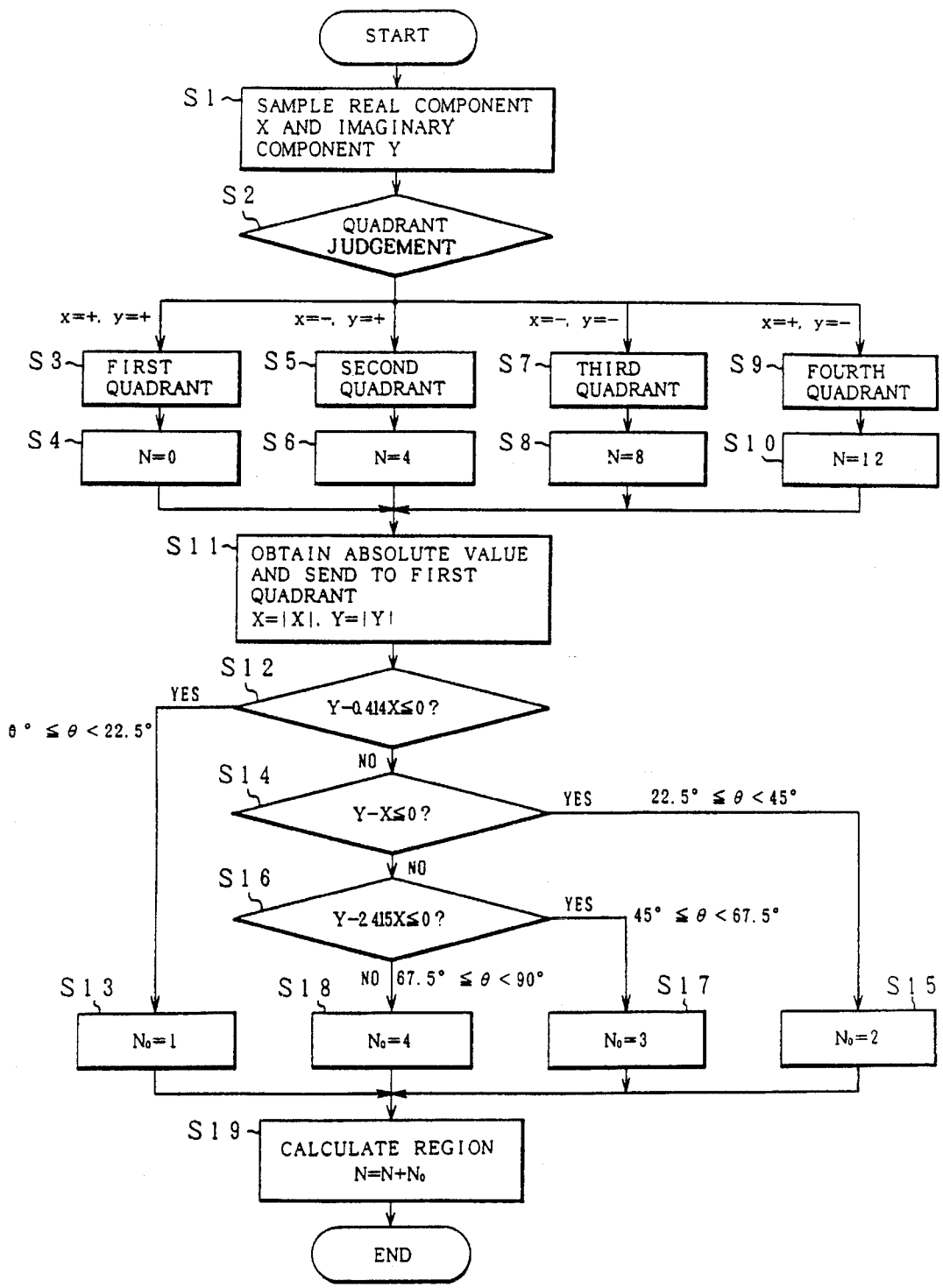
FIG. 4 is a flowchart showing a conventional timing phase judging process.
Figure 5:
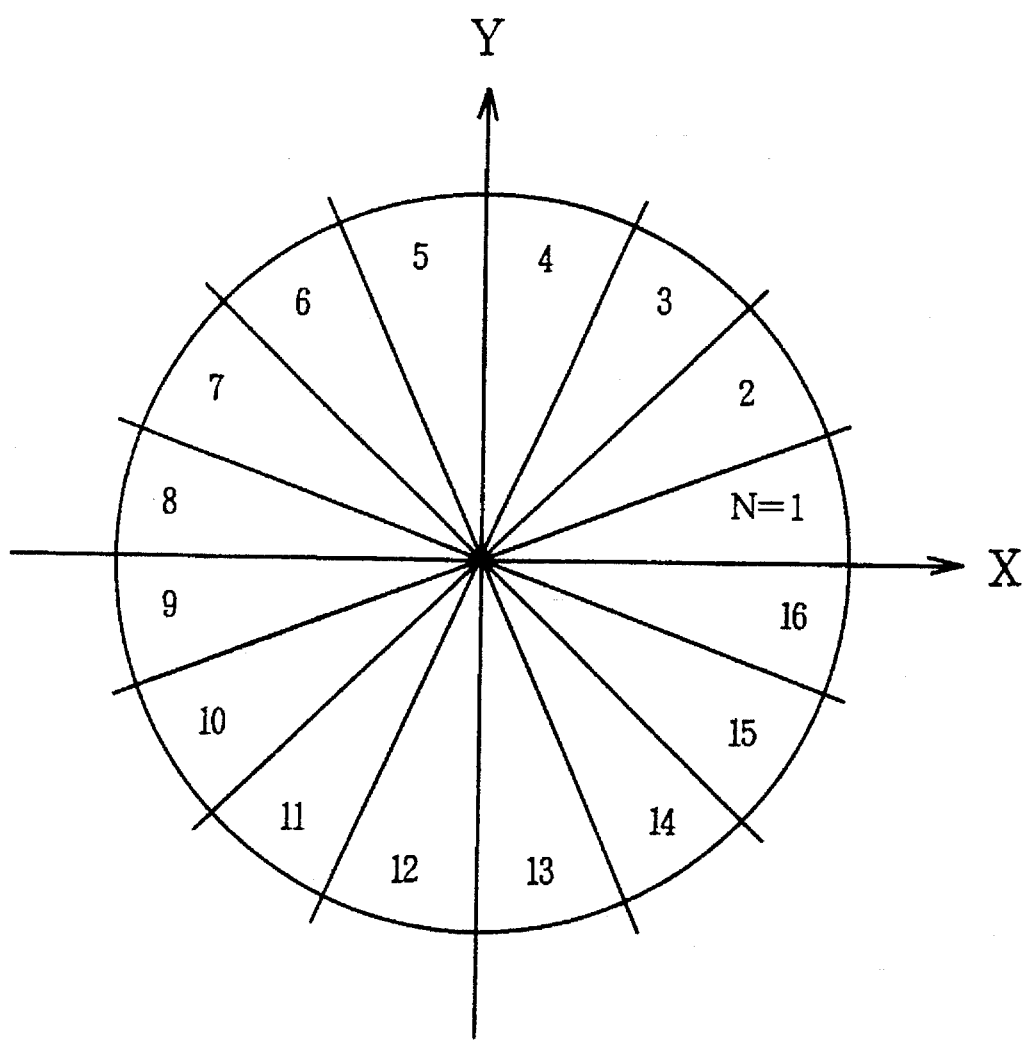
FIG. 5 is an explanatory diagram of a phase plane which is divided into 16 regions and is used for judgment of a timing phase.

Further, FIG. 1 shows a state in which the signal was rotated to a vector signal 82 of the first quadrant when an input vector signal 80 exists in the fourth quadrant. In this case, it is sufficient to rotate the signal by −270°. It is sufficient that the offset phase angle $\theta_2$ to return the phase angle $\theta_1$ in the first quadrant to the original vector signal 80 is set to $\theta_2=-0.5$. Specifically speaking, the offset value $c=-0.5+2^{-6}$ in which the rounding process was performed to the position of the fourth quadrant in the ROM table 54 in FIG. 8 is stored.

Therefore, the judgment phase calculating section 48 shown in FIG. 8 executes an arithmetic operation $$\theta = \theta_1 + \theta_2 = (Y+X) \cdot 0.5 + c \qquad (3)$$

as a phase number $\theta$ to which the input vector signal belongs. That is, the vector signal (X+jY) which was rotated into the first quadrant by the adder 58 is divided into the real component X and the imaginary component Y and, after that, they are added to thereby obtain (Y−X) by an adder 58. Subsequently, the coefficient K=0.5 set by a coefficient setting device 62 is multiplied by a multiplier 60, thereby obtaining {(Y−X)·0.5}. Finally, the offset value c read out from the ROM table 54 is added by an adder 64.

Figure 16:
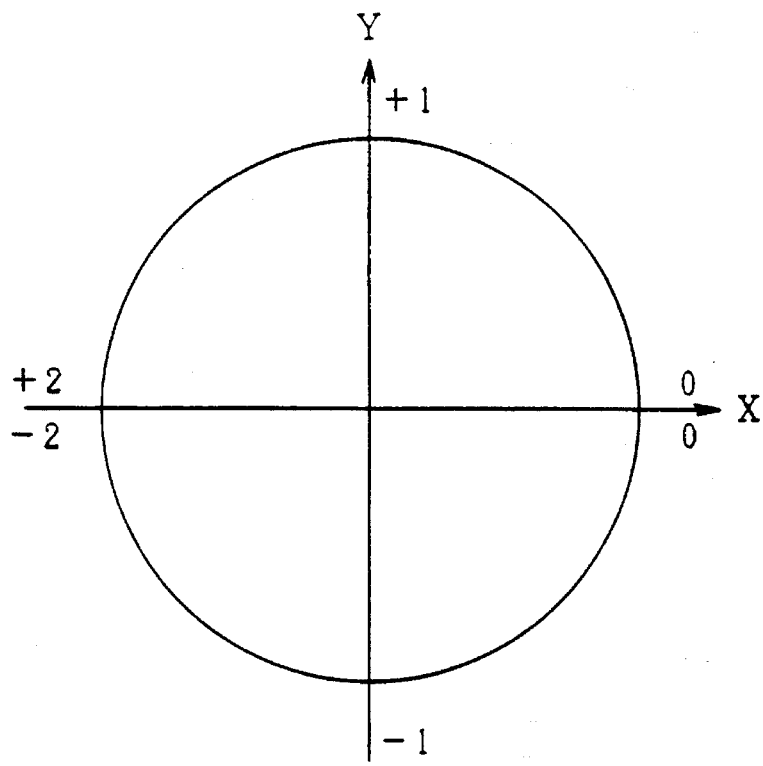
FIG. 16 is an explanatory diagram showing a numerical value expression of the phase angle according to the invention.

In FIG. 8, since a relation shown in FIG. 16 has been predetermined between the phase angle and the numerical value range, the limiter section 50 provided subsequent to the judgment phase calculating section 48 executes a limiting process to clip to +2 in the case where the phase angle $\theta$ calculated by the judgment phase calculating section 48 is equal to or larger than the upper limit value +2 and to clip to −2 in the case where the phase angle $\theta$ is less than the lower limit value −2. Due to this, even when the numerical value out of the range of +2 to −2 is calculated by a variation or the like of the arithmetic operation, the numerical value range is limited to a range of +2 to −2 and the phase angle of 0 to $2\pi$ of all of the quadrants can be expressed as a continuous amount.

The judgment phase information section 52 provided at the final stage has bit information forming sections 66 and 68. The bit information forming section 66 forms the timing information D0 of one bit. The bit information forming section 68 forms two kinds of 3-bit timing phase information D1 and D2. The timing information D0, D1, and D2 are separately shown as D0, D1, and D2 with respect to the timing information in FIGS. 7 to 10. The timing information of one bit is the most significant bit of the 7-bit timing phase information calculated. The two remaining 3-bit timing phase information D1 and D2 are obtained by dividing the lower bits subsequent to the most significant bit on a 3-bit unit basis. When the 7-bit timing phase information is expressed by a decimal notation by using a weight of each bit shown in FIG. 10, the phase Nos. 0 to 127 themselves are shown.

Figure 17:
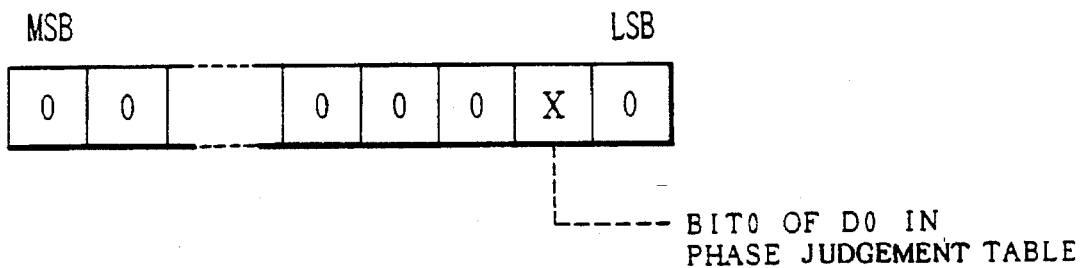
FIG. 17 is an explanatory diagram of a format of timing phase information D0 of one bit.

FIG. 17 shows the timing phase information D0 of one bit which is formed by the bit information forming section 66 in FIG. 8. The timing phase information D0 is the byte data for one phase control. The information in which the most significant bit MSB of the timing phase information was inputted as X of the lower second bit is formed.

Figure 18:
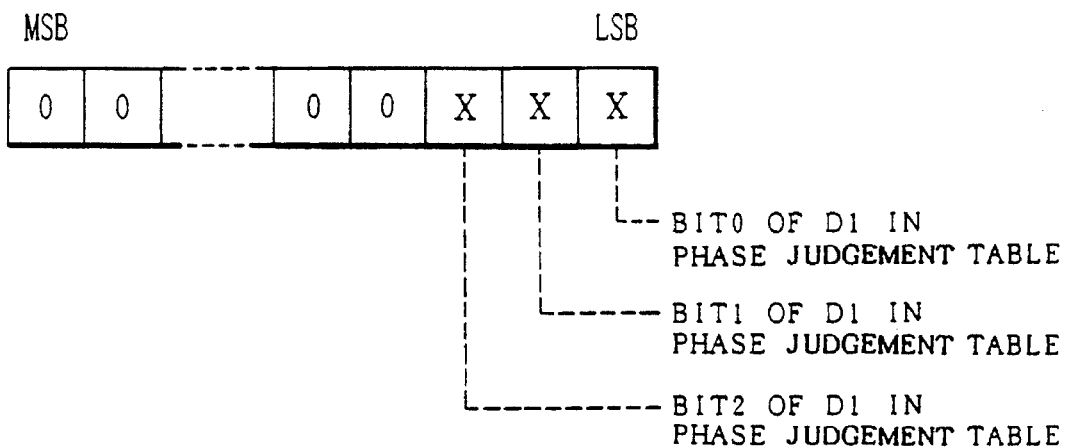
FIG. 18 is an explanatory diagram of a format of timing phase information D1 of three bits.
Figure 19:
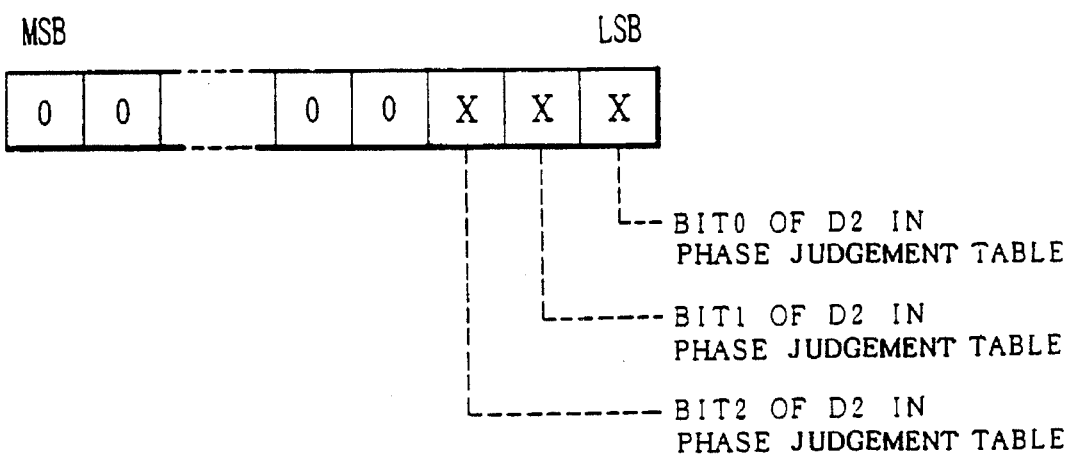
FIG. 19 is an explanatory diagram of a format of timing phase information D2 of three bits.

FIGS. 18 and 19 show a byte construction of the two kinds of timing phase information D1 and D2 having the content of three bits which are formed by the bit information forming section 68. As for the timing phase information D1 and D2, the information in which the 3-bit data "XXX" of the timing phase information calculated to the lower three bits of the byte data was inputted is formed, respectively.

Figure 20:
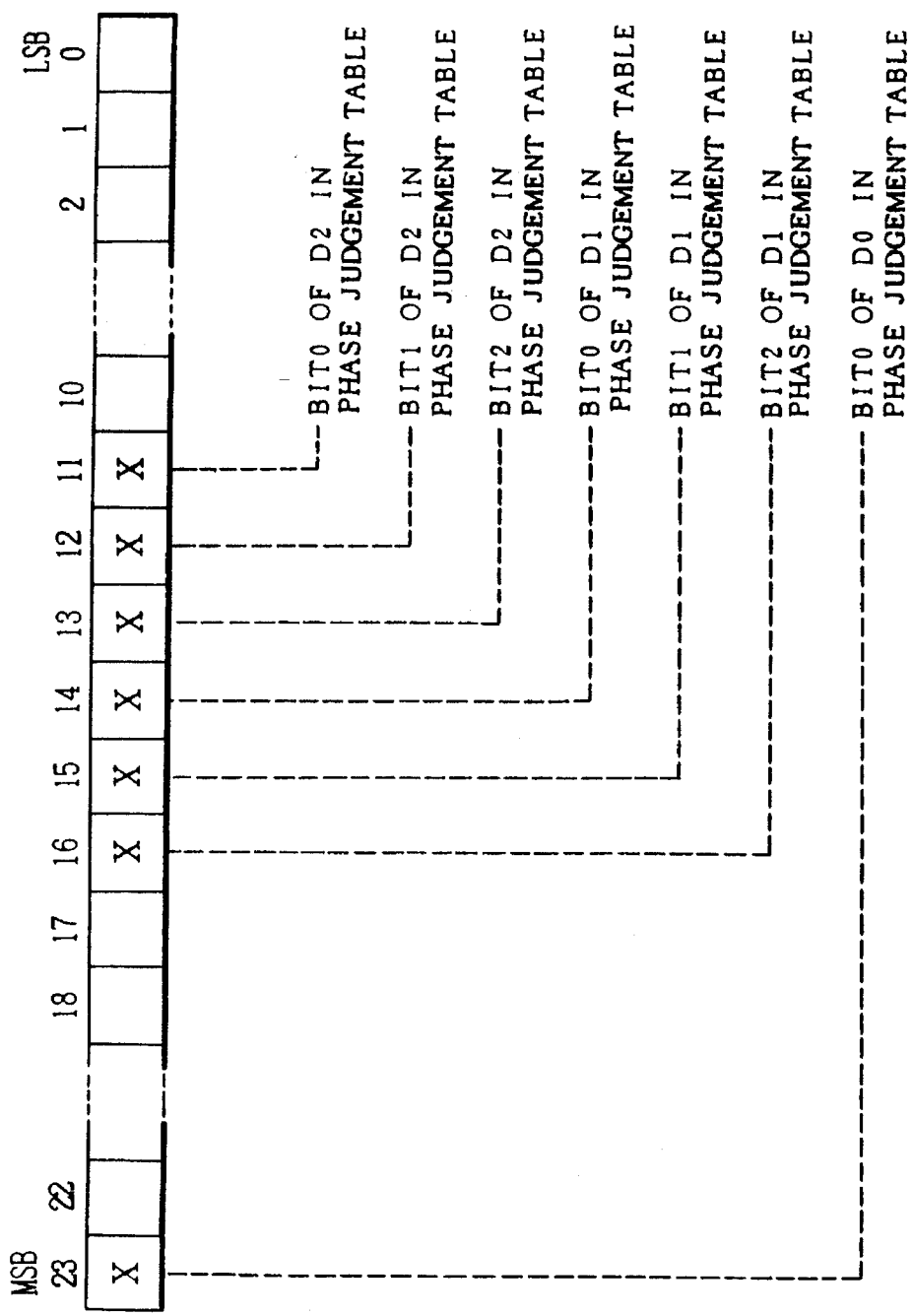
FIG. 20 is an explanatory diagram of a format of byte data of 24 bits which are used in actual processes of the digital signal processor.

FIG. 20 shows actual byte data of the digital signal processor to judge the timing phase. As shown in FIG. 10, although eight bits can be fundamentally realized by one byte, since the SDP actually operates by the byte data of 24 bits as shown in FIG. 20, the most significant bit $b_7$ in FIG. 10 is allocated to the MSB bit. The bits $b_6$ to $b_0$ in FIG. 10 are allocated to the lower bits 16 to 11. The timing phase information of one bit and three bits as shown in FIGS. 11 to 14 are formed from the bit 20 and bits 16 to 11 of the byte data shown in FIG. 20.

Figure 21:
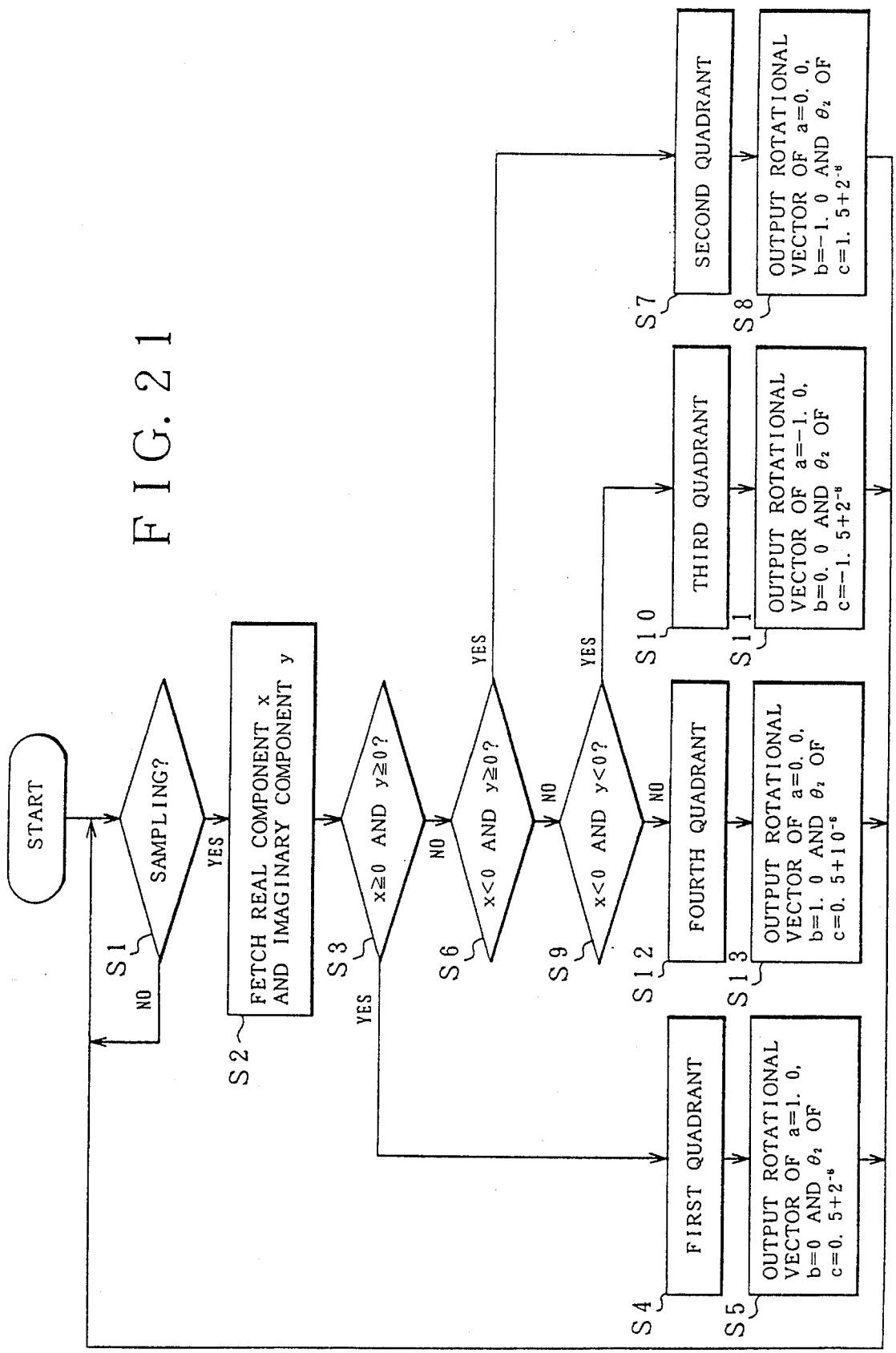
FIG. 21 is a flowchart showing judgment control process in FIG. 8.

A flowchart of FIG. 21 shows the processing operation of the judgment control section 38 shown in FIGS. 7 and 8. In step S1, each time a sampling period comes, step S2 follows and the real component x and imaginary component y of the input vector signal which is given as a digital value obtained by the sampling are fetched. By judging the polarity of each component by processes in steps S3, S6, and S9, a check is made to see if the signal belongs to which one of the first to fourth quadrants. That is, in step S3, when the real component x is equal to or larger than 0 and the imaginary component y is equal to or larger than 0, step S4 follows and it is determined that the signal belongs to the first quadrant. The processing routine advances to step S5. In step S5, with reference to the ROM table 54, the coefficient (a)=1.0 and (b)=0 for the rotational vector are generated and the offset value $c=0.5+2^{-6}$ is generated as an offset phase angle $\theta_2$. In step S6, when the real component x is smaller than 0 and the imaginary component y is equal to or larger than 0, step S7 follows and the second quadrant is decided. In step S8, the corresponding coefficients (a, b, c) are read out from the ROM table 54 and outputted. In step S9, when both of the real component x and the imaginary component y are smaller than 0, the third quadrant is decided in step S10 and the processing routine advances to step S11. In step S11, the values of the coefficients (a, b, c) corresponding to the third quadrant are read out from the ROM table 54 and outputted. Further, step S9 follows and when the conditions for the third quadrant are not satisfied, the fourth quadrant is decided in step S12. The processing routine advances to step S13 and the coefficients (a, b, c) corresponding to the fourth quadrant are read out from the ROM table 54 and outputted.

On the basis of the coefficients (a, b, c) read out from the ROM table 54 according to the result of the quadrant judgment by the judgment control section 38, the phase numbers in the 128 divided phase regions to which the input vector signal belongs are obtained by the first quadrant converting section 46 and judgment phase calculating section 48 and are finally outputted as three kinds of timing phase information D0, D1, and D2 to the control filter 18 by the judgment phase information forming section 52.

Although the above embodiment relates to an example in the case where the phase plane is divided into 128 regions, the number of divided regions can be also increased $2^n$. In this case, in association with an increase in dividing number, the number of bits which are necessary to calculate the timing judgment phases merely increases. There is no need to fundamentally change the coefficients (a, b, c) stored in the ROM table 54. With respect to the weights for the rounding process added to the coefficient (c), it is sufficient to change to $2^{-n}$ in association with the increase of $2^n$ of the dividing number. Therefore, even when the dividing number of the phase plane increases, the hardware amount of the ROM and the arithmetic operation amount are not changed and the arithmetic operating process to obtain the judgment precision according to the necessity can be executed.

Figure 22:
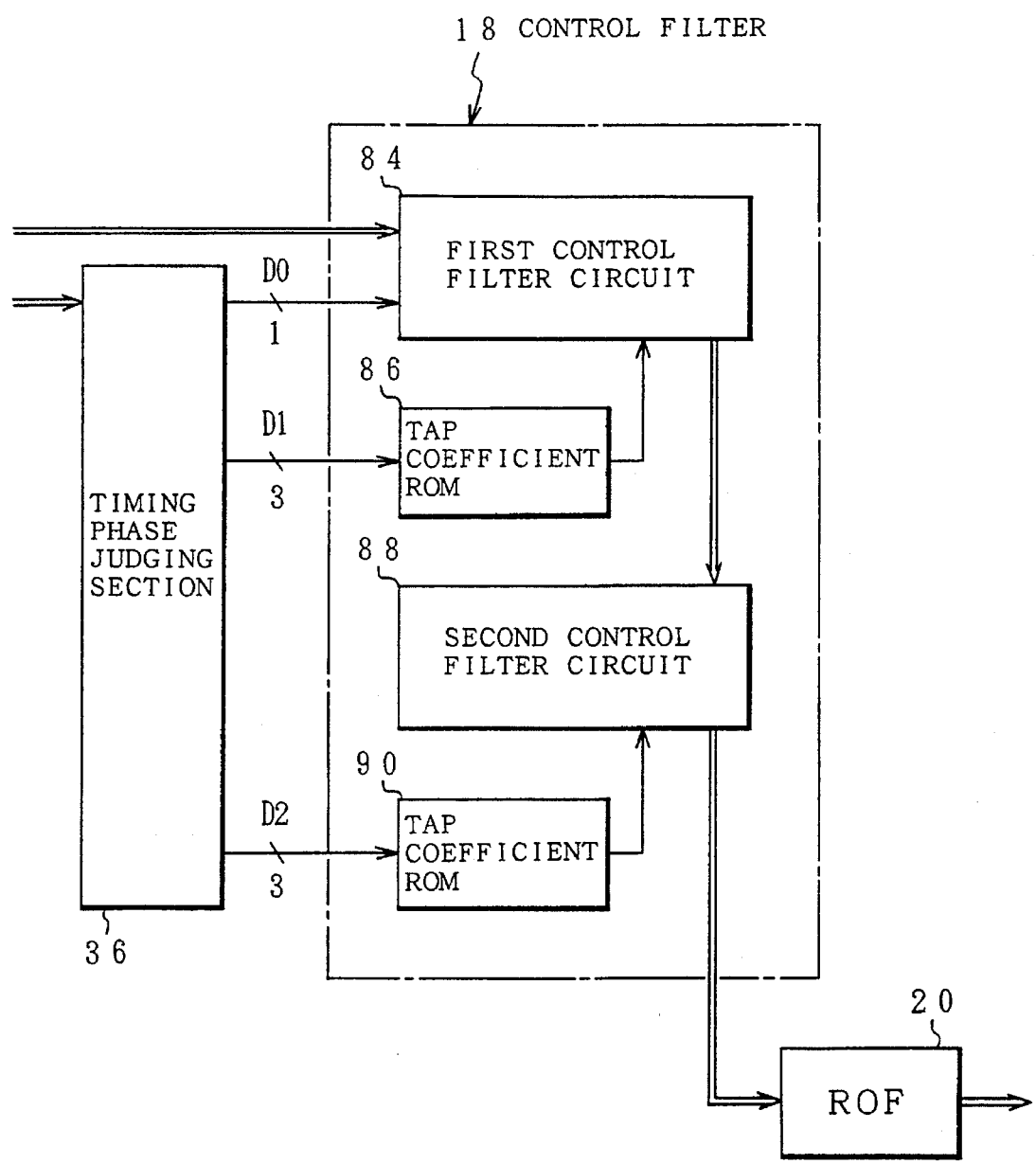
FIG. 22 is a block diagram of a control filter which is controlled by the invention.

FIG. 22 shows the details of the control filter 18 provided in the processor section 12 in FIG. 6. The control filter 18 comprises a first control filter section 84, a filter coefficient ROM 86, a second control filter section 88, and a filter coefficient ROM 90. The timing phase information D0 of one bit from the timing phase judgment section 36 is given to the first control filter section 84. The next 3-bit timing phase information D1 is given to the filter coefficient ROM 86. The further next 3-bit timing phase information D2 is given to the filter coefficient ROM 90.

Figure 23:
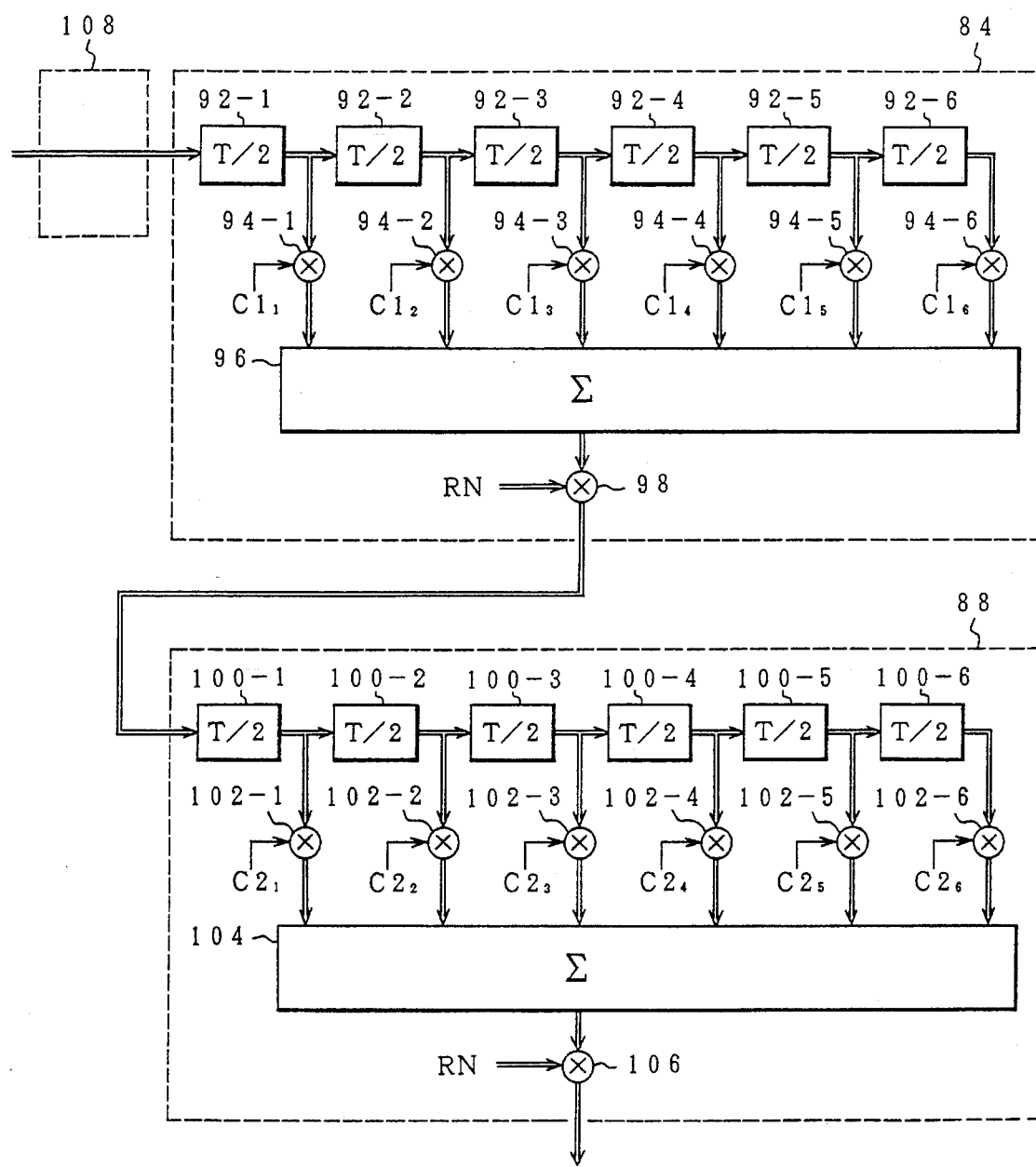
FIG. 23 is an equivalent circuit diagram showing the details of FIG. 22 in the case where the timing phase information D0=0 bit.

FIG. 23 shows the details of the first control filter section 84 and second control filter section 88 in FIG. 22. The first control filter section 84 has delay taps 92-1 to 92-6 of T/2. Tap outputs of the delay taps 92-1 to 92-6 are supplied to multipliers 94-1 to 94-6, by which filter coefficients $C1_1$ to $C1_6$ are multiplied to the tap outputs. The total of the values as results of the multiplications is obtained by an adder 96. Further, the rounding process is executed by a multiplier 98 provided for an output of the adder 96. In a manner similar to the first control filter section 84, the second control filter section 88 also has delay taps 100-1 to 100-6, multipliers 102-1 to 102-6, and an adder 104. Further, the rounding process is executed by a multiplier 106.

FIG. 25 shows the contents in the filter coefficient ROM 86 in FIG. 22. Addresses in the ROM 86 are designated by the timing phase information D1 from the timing phase judging section 36. The values K1 of the six corresponding filter coefficients are read out and supplied as filter coefficients $C1_1$ to $C1_6$ to the multipliers 94-1 to 94-6 of the first control filter section shown in FIG. 23. By the selection of the filter coefficients K1, the phase correction at the sampling timings of intervals of 22.5° is executed.

FIG. 26 shows the filter coefficient ROM 90 in FIG. 22. The timing phase information D2 from the timing phase judging section 36 is used as addresses and the six corresponding filter coefficients K2 are read out from the ROM 90 and supplied as filter coefficients $C2_1$ to $C2_6$ to the multipliers 102-1 to 102-6 of the second control filter section 88 shown in FIG. 23. By the selection of the filter coefficients $K_1$, the phase correction at the sampling timings of intervals of 2.8125° is executed.

Figure 27:
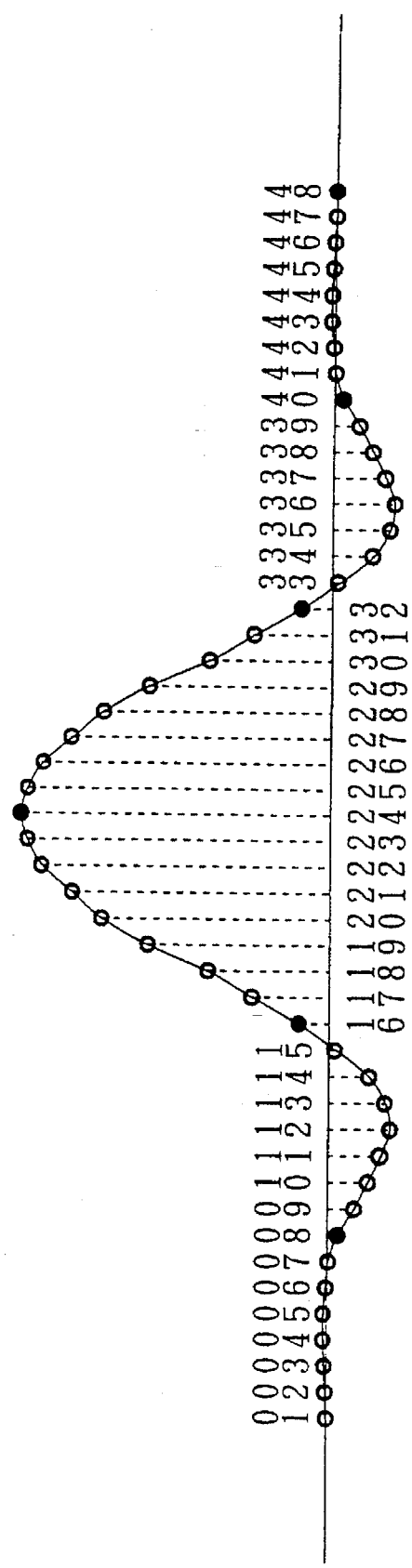
FIG. 27 is an explanatory diagram showing the positions in an impulse response of filter coefficients $K1_{01}$ to $K1_{48}$ of a first control filter circuit.

The filter coefficient values K1 in FIG. 25 and the tap coefficient values K2 in FIG. 26 are determined as follows. First, the filter coefficient values K1 in FIG. 25 are obtained by sampling the impulse response of the first control filter circuit 84 by the phase shown in FIG. 27. The filter coefficient values K2 in FIG. 26 are obtained by sampling the impulse response of the second control filter circuit 88 by the phase shown in FIG. 28.

Figure 28:
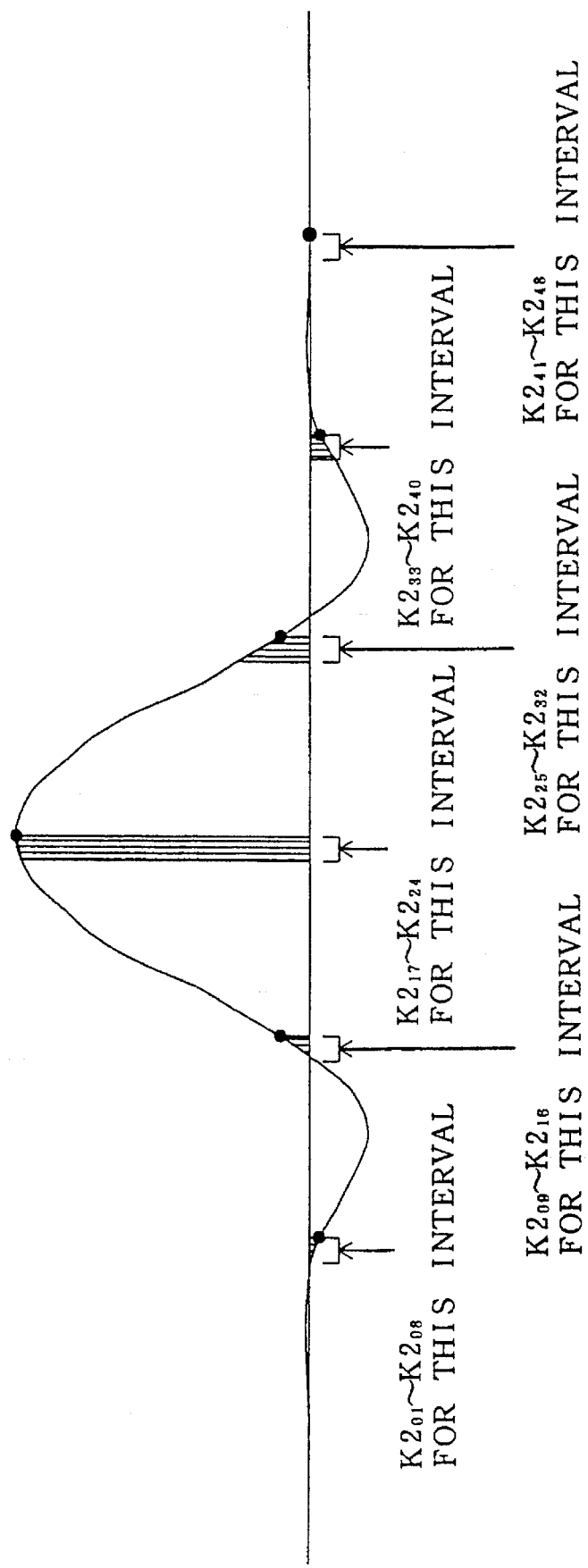
FIG. 28 is an explanatory diagram showing the positions in an impulse response of filter coefficients $K2_{01}$ to $K2_{48}$ of a second control filter circuit.
Figure 29:
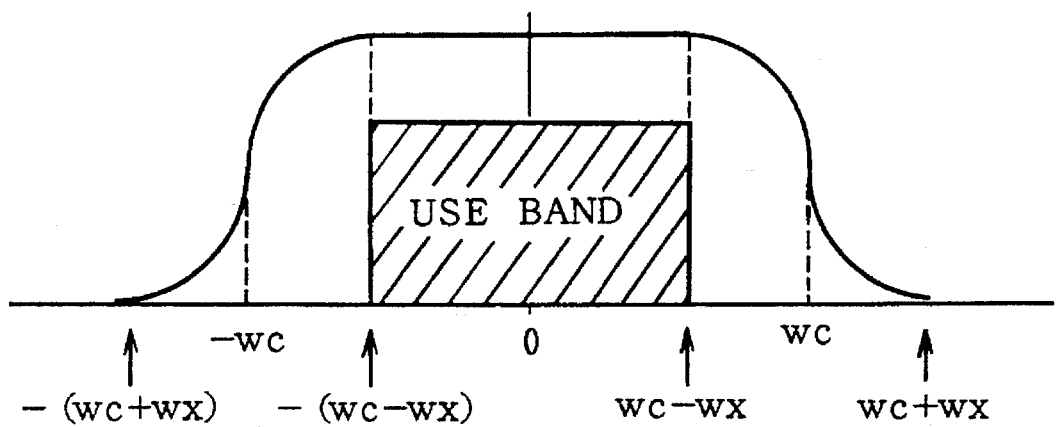
FIG. 29 is an explanatory diagram showing $COS^2$ characteristics of the first and second control filter circuits.

It is necessary to set frequency characteristics of the first control filter circuit 84 and second control filter circuit 88 so as not to cause a deterioration in the use band. Therefore, for example, in case of setting the frequency characteristics to $COS^2$ characteristics (raised cosine), characteristics as shown in FIG. 29 are used. The impulse responses in FIGS. 27 and 28 in the $COS^2$ characteristics in FIG. 29 are given by the following equation.

When $n \neq \pi/2wxT, 0$, $$h_n = \frac{1}{2n\pi} \text{SIN}(wc+wx)nT + \frac{1}{2n\pi} \text{SIN}(wc-wx)nT +$$

$$\frac{wxT}{2\pi(\pi+2wxnT)} \text{COS} \frac{(wc-wx)\pi}{2wx} \left[ \text{SIN} \frac{(wc+wx)(\pi+2wxnT)}{2wx} - \text{SIN} \frac{(wc-wx)(\pi+2wxnT)}{2wx} \right] -$$

$$\frac{wxT}{2\pi(\pi+2wxnT)} \text{SIN} \frac{(wc-wx)\pi}{2wx} \left[ \text{COS} \frac{(wc+wx)(\pi+2wxnT)}{2wx} - \text{COS} \frac{(wc-wx)(\pi+2wxnT)}{2wx} \right] +$$

$$\frac{wxT}{2\pi(\pi-2wxnT)} \text{COS} \frac{(wc-wx)\pi}{2wx} \left[ \text{SIN} \frac{(wc+wx)(\pi-2wxnT)}{2wx} - \text{SIN} \frac{(wc-wx)(\pi-2wxnT)}{2wx} \right] -$$

$$\frac{wxT}{2\pi(\pi-2wxnT)} \text{SIN} \frac{(wc-wx)\pi}{2wx} \left[ \text{COS} \frac{(wc+wx)(\pi-2wxnT)}{2wx} - \text{COS} \frac{(wc-wx)(\pi-2wxnT)}{2wx} \right]$$

When $n = 0$, $h_0 = (T/\pi)wc$

Figure 24:
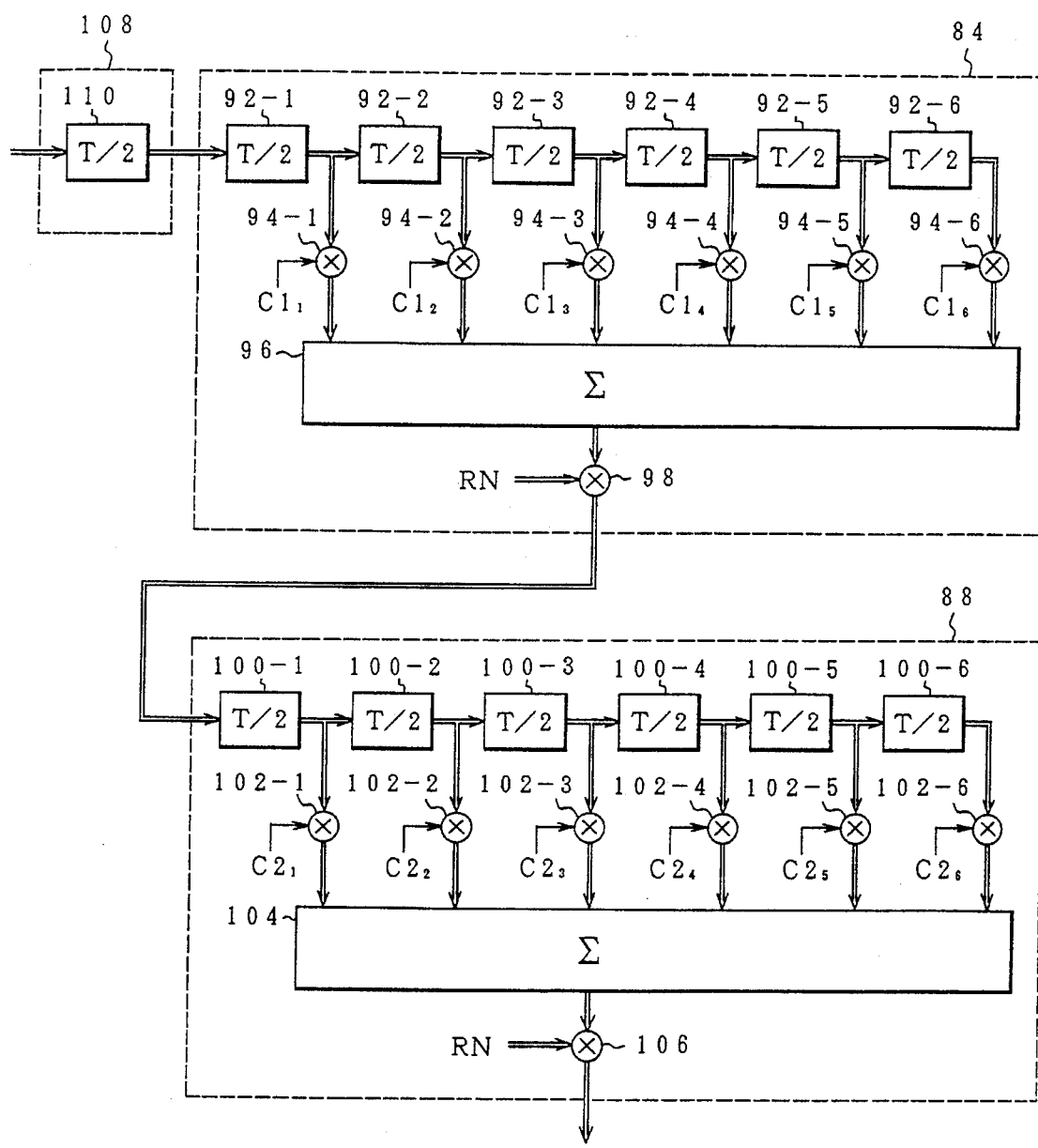
FIG. 24 is an equivalent circuit diagram showing the details of FIG. 22 in the case where the timing phase information D0=1 bit.

FIG. 23 shows the case where the 1-bit timing phase information D0 from the timing phase judging section 36 is set to bit 0. A circuit section 108 at the front stage of the first control filter section 84 is set to a through path. On the other hand, in the case where the timing phase information D0 is set to bit 1, a tap delay line 110 is provided for the circuit section 108 as shown in FIG. 24.

Figure 30:
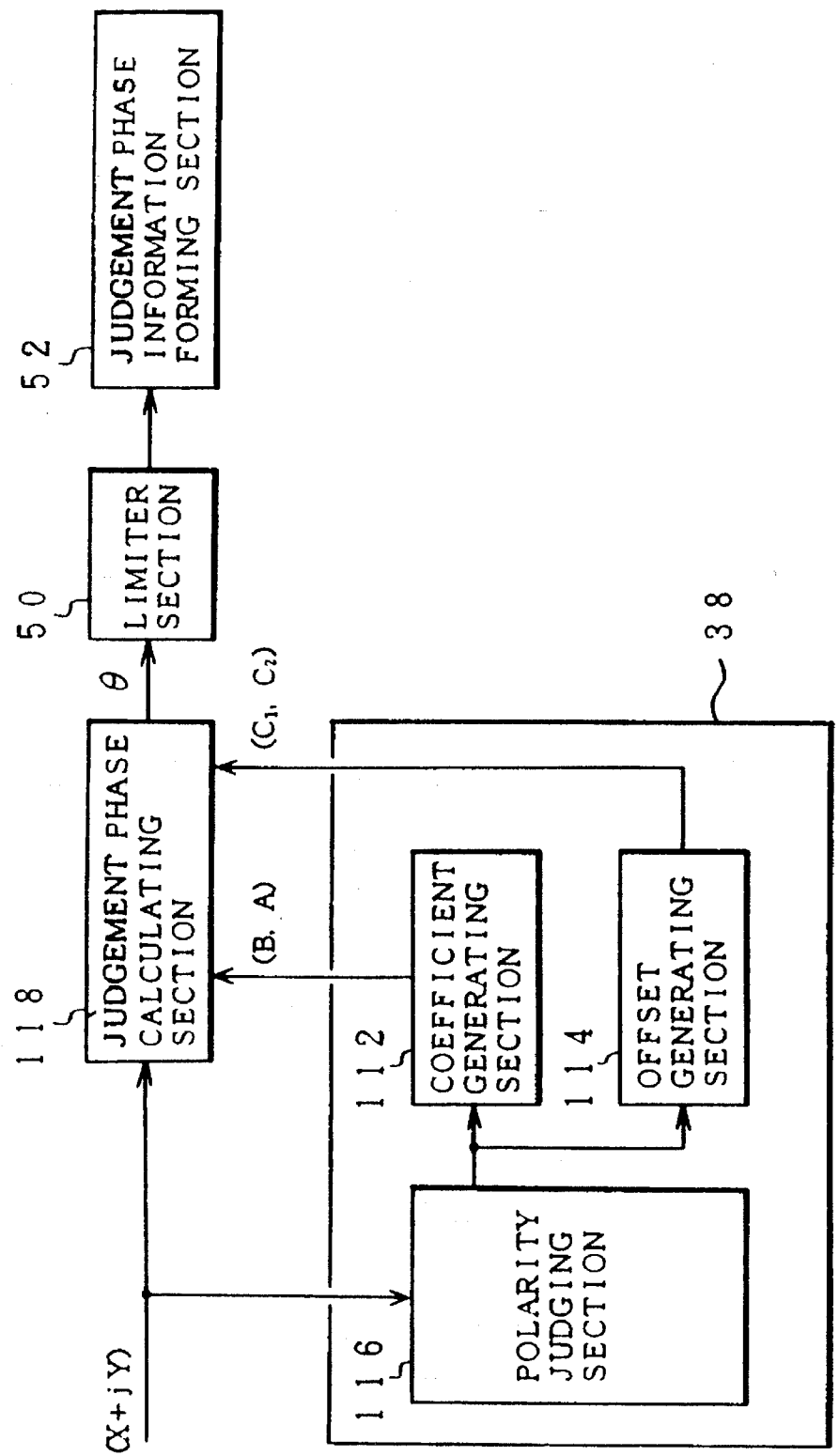
FIG. 30 is a block diagram showing the second embodiment of the invention.

FIG. 30 shows the second embodiment of the invention and shows a simple type in which the processes are further simplified as compared with the first embodiment. Although the timing phase judging section of the simple type has the judgment control section 38 in a manner similar to the first embodiment, a polarity judging section 116 is provided in place of the quadrant judging section 40 in the first embodiment. The functions of the first quadrant converting section 46 and judgment phase calculating section 48 in the first embodiment are integrated and realized as a judgment phase calculating section 118. Coefficients A and B are given to the judgment phase calculating section 118 from a coefficient generating section 112 provided for the judgment control section 38. Coefficients $c_1$ and $c_2$ to calculate the offset phase angle $\theta_2$ are also given to the judgment phase calculating section 118 from an offset generating section 114. The limiter section 50 and judgment phase information forming section 52 subsequent to the judgment phase calculating section 118 are similar to those in the first embodiment.

Figure 31:
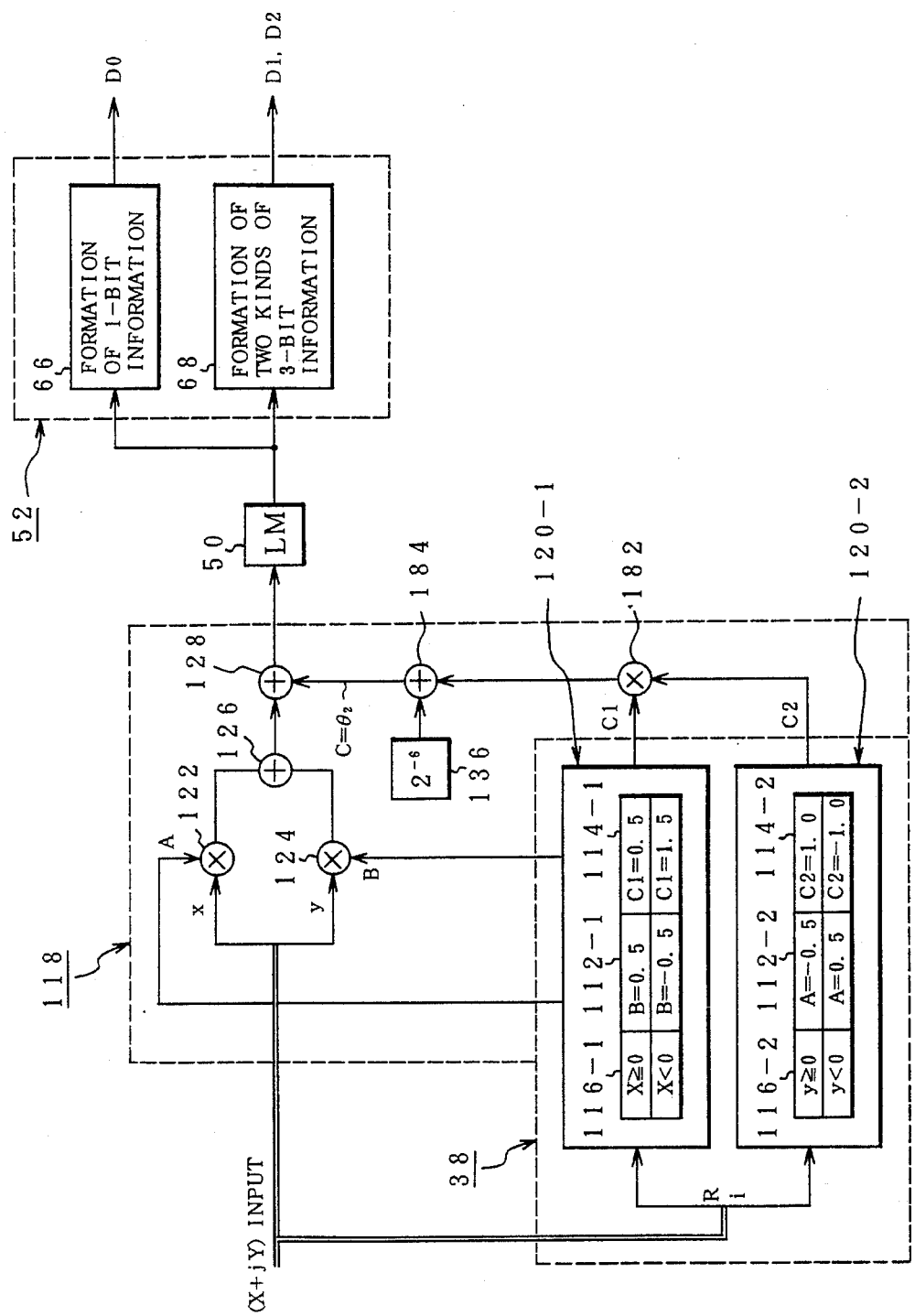
FIG. 31 is a block diagram showing the details of FIG. 30.

FIG. 31 shows the details of the second embodiment shown in FIG. 30. The judgment control section 38 is constructed by a real component judgment control section 120-1 and an imaginary component judgment control section 120-2. Further, polarity judging sections 116-1 and 116-2, coefficient generating sections 112-1 and 112-2, and offset generating sections 114-1 and 114-2 are provided. The functions of the polarity judging sections 116-1 and 116-2, coefficient generating sections 112-1 and 112-2, and offset generating sections 114-1 and 114-2 are practically realized by an ROM table in a manner similar to the first embodiment.

The coefficients (A, B) and ($c_1$, $c_2$) which are generated to calculate the numerical value information indicative of the timing phase $\theta$ in the judgment control section 38 of the second embodiment will now be described. FIG. 28 shows information to form each ROM table of the judgment control sections 120-1 and 120-2 in FIG. 31 by a table construction with respect to the first to fourth quadrants. First, in the invention, since the rotational vector signal to move the input vector signal (x+jy) into the first quadrant is (a+jb), the result of the rotation as shown in FIG. 32 can be obtained with respect to the vector rotated to the first quadrant.

In FIG. 32, when the rotational angles for the first to fourth quadrants is set to $\theta_2$, the coefficient a of the real component of the rotational vector is equal to $\cos \theta_2$ and the coefficient b of the imaginary component is equal to $\sin \theta_2$, so that they have values as shown in the table, respectively. This point is substantially the same as that in the first embodiment. Subsequently, the real component X of the vector rotated to the first quadrant is expressed by $$X = ax - yb = x \cdot \cos \theta_2 - y \cdot \sin \theta_2$$

Therefore, the real component X is shown by the real component x and the imaginary component y of the input vector signal shown in the table. Similarly, the imaginary component Y of the vector rotated to the first quadrant is expressed by $$Y = ya + xb = y \cdot \cos \theta_2 + x \cdot \sin \theta_2$$

Therefore, the imaginary component Y is expressed by the real component x and the imaginary component y of the input vector signal as shown in the table. Now, with respect to (Y−X) to obtain the phase angle $\theta_1$ in the first quadrant, $$Y - X = -(ax - yb) + (ya + xb)$$

Therefore, it is shown by an addition expression of the real component x and the imaginary component y of the input vector signal as shown in the table. Further, by multiplying K=0.5 to the addition expression, $$(Y-X) \cdot 0.5 = \{-(ax-yb)+(ya+xb)\} \cdot 0.5 \qquad (4)$$

is obtained.

Therefore, in the simple type of the invention, with regard to the equation (4), $$(-0.5a+0.5b)x + (0.5b+0.5a)y = Ax + By \qquad (5)$$

is defined. The values shown in FIG. 32 in the first to fourth quadrants of the coefficients A and B are stored as contents in the ROM table separately for the real component judgment control section 120-1 and the imaginary component judgment control section 120-2 as shown in the judgment control section 38 in FIG. 31. Further, with regard to the offset phase angle $\theta_2$ to return the vector rotated into the first quadrant into the original value, those values are stored separately for the offset value $c_1$ of the real component and the offset value $c_2$ of the imaginary component. The offset value c is obtained as $$c = c_1 \times c_2 \quad (6)$$

and is added to the calculated phase angle $\theta_1$.

Referring again to FIG. 31, the judgment phase calculating section 118 comprises multipliers 122 and 124 and adders 126 and 128. The coefficient A read out from the imaginary component judgment control section 120-2 on the basis of the Judgment of the polarity is multiplies to the real component x of the input vector signal (x+jy) by the multiplier 122. That is, when the polarity of the imaginary component y of the input vector signal is positive (y>0), the polarity judging section 116-2 reads out the coefficient A=−0.5 from the coefficient generating section 112-2. When the polarity of the imaginary component y is negative (y<0), the coefficient A=0.5 is read out. On the other hand, the multiplier 124 multiplies the coefficient B read out from the real component judgment control section 120-1 to the imaginary component y separated from the input vector signal. That is, when the real component x of the input vector signal is positive (x>0), the polarity judging section 116-1 reads out the coefficient B=0.5. When the real component x is negative (x<0), the coefficient B=−0.5 is read out. The multipliers 122 and 124 executes the multiplications in parallel. The adder 126 adds an addition output Ax of the multiplier 122 and an output By of the multiplier 124. Further, the adder 128 adds the offset value (c) indicative of the offset phase angle $\theta_2$. The offset value (c) is calculated by a multiplier 182 and an adder 184.

On the basis of the results of the polarity judgments of the real component x and imaginary component y of the input vector signal at that time, the offset values $c_1$ and $c_2$ of each component are generated from the offset generating sections 114-1 and 114-2, and the real component judgment control section 120-1 and imaginary component judgment control section 120-2 obtain the offset value (c) by multiplying the offset values $c_1$ and $c_2$ by the multiplier 132. That is, the offset generating section 114-1 which is used in the real component judgment control section 120-1 generates the offset value $c_1$=0.5 when the real component x of the input vector signal is positive and generates $c_1$=1.5 when the real component x is negative. On the other hand, the offset generating section 114-2 provided for the imaginary component judgment control section 120-2 generates the offset value $c_2$=1 when the polarity of the imaginary component y of the input vector signal is positive. When the polarity is negative, the offset generating section 114-2 generates $c_2$=−1.0.

The constant $2^{-6}$ for the rounding process which is outputted from a constant setting device 136 is added to the multiplication output of the multiplier 182 by the adder 184, the offset value c which indicates the offset phase angle $\theta_2$ and is expressed by a numerical value can be obtained. Thus, the offset value c is set to the same value in the first to fourth quadrants shown in the ROM table 54 in the first embodiment of FIG. 8.

Figure 33:
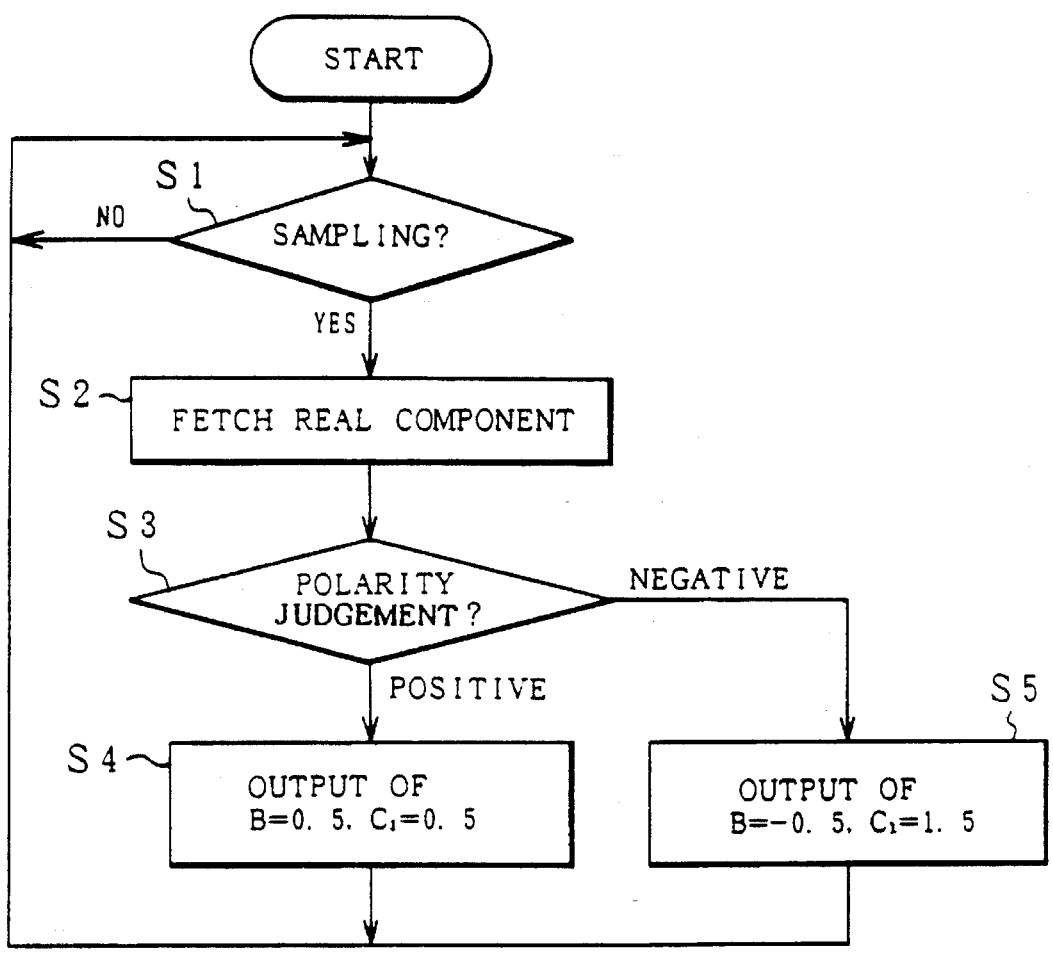
FIG. 33 is a flowchart showing a real component polarity judging process in FIG. 28.

A flowchart of FIG. 33 shows the processing operation of the real component judgment control section 120-1 shown in FIG. 31. First, in step S1, when a sampling period comes, the processing routine advances to step S2 and the real component x of the sampled input vector signal is fetched. The polarity is judged in step S3. When it is positive as a result of the polarity judgment, step S4 follows and the coefficient B=0.5 and the offset value $c_1$=−0.5 are generated. When the polarity is negative, step S5 follows and the coefficient B=−0.5 and the offset value $c_1$=1.5 are generated.

Figure 34:
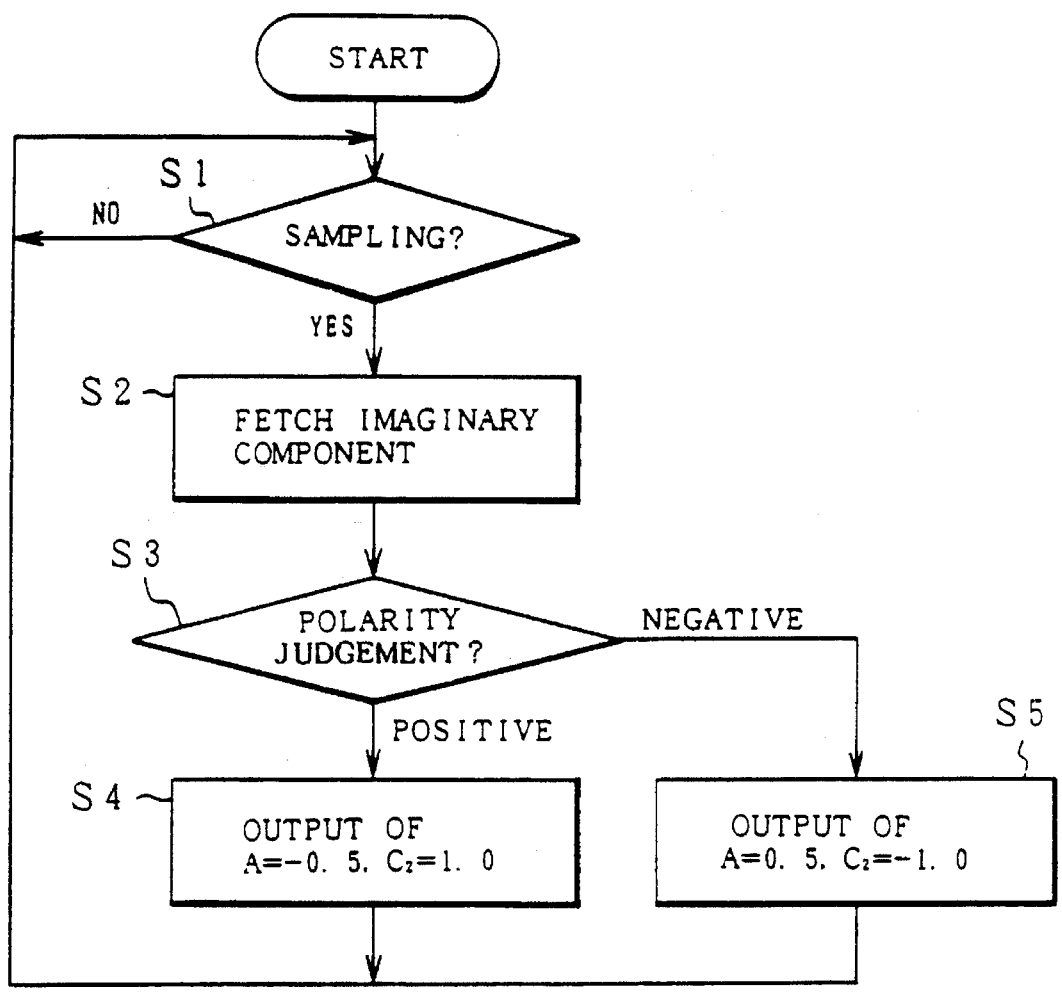
FIG. 34 is a flowchart showing an imaginary component polarity judging process of FIG. 31.

A flowchart of FIG. 34 shows the processing operation of the imaginary component judgment control section 120-2 in FIG. 31. First, in step S1, each time a sampling time comes, step S2 follows and the imaginary component y of the input vector signal is fetched. The polarity is judged in step S3. When it is positive, the coefficient A=−0.5 and the offset value $c_2$=1.0 are generated in step S4. When the polarity is negative, step S5 follows and the coefficient A=0.5 and the offset value $c_2$=−1.0 are generated.

When the judging process of the second embodiment shown in FIGS. 33 and 34 is compared with the quadrant judging process in the first embodiment shown in FIG. 21, in FIG. 21, as shown in steps S3, S6, and S9, a judgment regarding to which one of the first to fourth quadrants the signal belongs is executed every three times with respect to each of the real component and the imaginary component. Therefore, the comparing judgments of total six times are necessary. On the other hand, in the second embodiment of FIGS. 33 and 34, it is sufficient to execute the polarity judgment two times with respect to the real component and imaginary component. Therefore, the number of judging processes to obtain the coefficients which are used in the calculation of the judgment phase can be reduced into ⅓ as compared with that in the first embodiment. A processing amount can be further decreased. The judging process at a higher speed can be realized.

Although the above embodiment relates to the case of dividing the phase plane into 128 regions as an example, the invention is not obviously limited to the dividing number of the phase plane.

The above embodiment has been described as an example with respect to the case where the phase angle $\theta$=0 to $2\pi$ of all of the quadrants to execute the timing phase judgment is handled as continuous amount in a numerical value range of 0 to +2 for $0 \leq \theta \leq \pi$ and is handled as a continuous amount in a numerical value range of −2 to 0 for $\pi \leq \theta \leq 2\pi$. However, such a numerical value range can be also properly determined.

Fundamentally, in the case where the numerical value range is normalized and the phase angle $\theta$ is handled as a continuous amount in a numerical value range of 0 to +1 for $0 \leq \theta \leq \pi$ and is handled as a continuous amount in a numerical value range of −1 to 0 for $\pi \leq \theta \leq 2\pi$, all of the coefficients a, b, c, A, B, $c_1$, and $c_2$ shown in the first and second embodiments are set to the half values. Therefore, as a general type, in the case where the phase angle is handled as a continuous amount in a numerical value range of 0 to +N for $0 \leq \theta \leq \pi$ and is also handled as a continuous amount in a numerical value range of −N to 0 for $\pi \leq \theta \leq 2\pi$, the coefficients a, b, c, A, B, $c_1$, and $c_2$ obtained with respect to the normalized numerical value range are set to the values which were increased by N times.

According to the invention as mentioned above, the timing phase can be judged by using the constants which don't depend on the dividing number of the phase plane to divide the judgment precision of the timing phase. Therefore, the phase dividing number is increased and the judgment precision can be improved without increasing the hardware amount and the processing amount.

What is claimed is:

1. A timing phase judging apparatus of a modem for data communication, comprising:

input means for inputting a vector signal (x+jy) which has a real component (x) and an imaginary component (y) sampled from a line reception signal into a digital value;

quadrant judging means for judging a quadrant of a phase plane to which said vector signal (x+jy) received from said input means belongs;

rotational vector generating means for generating a rotational vector signal (a+jb) which rotates the vector signal (x+jy) into the first quadrant judging means, where a is a real component of the rotational vector and b is an imaginary component of the rotational vector (a+jb);

offset generating means for generating an offset phase angle ($\theta_2$) to return the input vector signal which was rotated into the first quadrant into the original signal on the basis of the result of the judgment of the quadrant judging means;

first quadrant converting means for multiplying the rotational vector signal (a+jb) from the rotational vector generating means and the input vector signal (x+jy) and for converting the product of the multiplication into a vector signal (X+jY) in the first quadrant, where X is a real component of the vector signal (X+jY) rotated to be first quadrant by the rotational vector (a+jY) and Y is an imaginary component of the vector signal (x+jY) rotated to the first quadrant by the rotational vector (a+jY);

judgment phase calculating means for detecting a phase rotational angle ($\theta_1$) in the first quadrant of the vector signal (X+jY) which was rotated into the first quadrant by said first quadrant converting means, for adding an offset phase angle ($\theta_2$) generated from said offset generating means to said phase angle ($\theta_1$) on the basis of the result of the judgment of said quadrant judging means, and for calculating a phase rotational angle ($\theta$) at the phase plane from the first quadrant to the fourth quadrant at which the input vector signal is actually located; and judgment phase information forming means for dividing the phase plane into a plurality of regions for every predetermined angle and for forming and generating phase judgment information indicative of a region to which the phase rotational angle ($\theta$) obtained by said judgment phase calculating means belongs.

2. An apparatus according to claim 1, wherein in the case where the phase angle $\theta$ of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, where N is an arbitrary integer, said rotational vector generating means generates the values of a real component (a) and an imaginary component (b) of the rotational vector (a+jb) as follows:

in the first quadrant, a=+0.5N, b=0.00
in the second quadrant, a=0.00, b=0.5N
in the third quadrant, a=−0.5N, b=0.00
in the fourth quadrant, a=0.00, b=+0.5N.

3. An apparatus according to claim 1, wherein in the case where the phase angle $\theta$ of all of the quadrants of the phase plane is handled as a continuous amount in a numerical value of 0 to +N for $0 \leq \theta \leq \pi$ and is also handled as a continuous amount in a numerical value range of −N to 0 for $\pi \leq \theta \leq 2\pi$, where N is an arbitrary integer, said offset generating means generates the following values as numerical values indicative of the offset phase angle ($\theta_2$):

in the first quadrant, $\theta_2$=+0.25N
in the second quadrant, $\theta_2$=+0.75N
in the third quadrant, $\theta_2$=−0.75N
in the fourth quadrant, $\theta_2$=−0.25N.

4. An apparatus according to claim 1, wherein said first quadrant converting means has a multiplier to multiply the rotational vector signal (a+jb) from said rotational vector generating means and the input vector signal (x+jy), and wherein said judgment phase calculating means comprises:

an adder for separating an output (X+jY) of said multiplier into a real component (X) and an imaginary component (Y) and for obtaining a value (Y−X) in which the real component (X) is subtracted from the imaginary component (Y); and a coefficient multiplier for multiplying a predetermined coefficient (K) with an output of said adder.

5. An apparatus according to claim 4, wherein in the case where the phase angle $\theta$ of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, where N is an arbitrary integer, said coefficient multiplier multiplies the coefficient K=0.25n and obtains the phase angle ($\theta_1$) of the vector signal which was rotated into the first quadrant as a numerical value of {(Y−X)·0.25N}.

6. An apparatus according to claim 1, further comprising rounding processing means for executing a rounding process to the numerical value of the phase angle ($\theta$) obtained by said judgment phase calculating means.

7. An apparatus according to claim 1, further comprising limiter means for limiting the numerical value of the judgment phase angle ($\theta$) from said judgment phase calculating means into a specified range.

8. An apparatus according to claim 7, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, where N is an arbitrary integer, said limiter means clips to an upper limit value +N when the numerical value of the phase angle ($\theta$) which is outputted from said judgment phase calculating means is larger than said upper limit value +N and clips to a lower limit value −N when said numerical value is smaller than the lower limit value −N, thereby handling the judgment phase as a continuous amount in a numerical value range to +N to −N.

9. An apparatus according to claim 1, wherein said judgment phase information output means divides the phase plane into $2^n$ regions and forms bit information indicative of the region to which the phase angle ($\theta$) belongs.

10. A timing phase judging apparatus of a modem for data communication, comprising:

input means for inputting a vector signal (x+jy) which has a real component (x) and an imaginary component (y) sampled from a line reception signal into a digital value;

coefficient generating means for generating values of coefficients (A, B), where A and B are coefficients indicative of an angle $\theta_1$ that is determined by the real component a and the imaginary component b of the rotational vector signal (a+jb), indicative of a phase angle ($\theta_1$) in correspondence to the polarity of each of the real component (x) and imaginary component (y) of the input vector signal (x+jy) in the case where a relational expression $$\{-(xa-yb)+(ya+yb)\} \cdot K = Ax + By$$

showing the phase angle ($\theta_1$) of a vector signal (X+jY) which was rotated into a first quadrant by multiplying a rotational vector (a+jb), where a and b are a real component and an imaginary component respectively of (a+jb), with the input vector signal (x+jy) from said input means is defined;

offset generating means for generating a real component offset value ($c_1$) and an imaginary component offset value ($c_2$) indicative of an offset phase angle ($\theta_2$) to return the vector signal (X+jY) which was rotated into the first quadrant into the original signal in correspondence to the polarity of each of the real component (x) and imaginary component (y) of the input vector signal;

polarity judging means for judging the polarity of each of the real component (x) and imaginary component (y) of the input vector signal;

judgment phase calculating means for obtaining a numerical value (Ax+By) indicative of the phase angle ($\theta_1$) when the input vector signal is rotated into the first quadrant on the basis of the coefficients (A, B) generated from said coefficient generating means in accordance with the polarities judged by said polarity judging means, for adding an offset value (c) indicative of the offset phase angle ($\theta_2$) generated from the offset generating means in accordance with the polarities judged by said polarity judging means, and for obtaining a judgment phase angle ($\theta$) of the vector signal; and judgment phase information forming means for dividing the phase plane into a plurality of regions at every predetermined angle and for forming and generating phase judgment information showing the region to which the judgment phase angle ($\theta$) obtained by said judgment phase calculating means belongs.

11. An apparatus according to claim 10, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of –N to 0 for $\pi \leq \theta \leq 2\pi$, where N is an arbitrary integer, said coefficient generating means generates the following values when x is positive, B=+0.25N when x is negative, B=–0.25N when y is positive, A=–0.25N when y is negative, A=+0.25N as said coefficients (A, B) for the polarities of the real component (x) and imaginary component (y) of the input vector signal, and said offset generating means generates the following values when x is positive, $c_1$=+0.25N when x is negative, $c_1$=+0.75N when y is positive, $c_2$=+0.50N when y is negative, $c_2$=–0.50N as each of said offset values ($c_1$, $c_2$) for the polarities of the real component (x) and imaginary component (y) of the input vector signal.

12. An apparatus according to claim 10, wherein said judgment phase calculating means comprises:

a pair of multipliers for multiplying each of the coefficients (A, B) generated in accordance with the polarities of the real component and imaginary component of the input vector signal from said coefficient generating means to each of the real component (x) and imaginary component (y) of the input vector signal;

a first adder for adding outputs of said pair of multipliers;

an offset multiplier for multiplying offset components ($c_1$, $c_2$) generated in accordance with the polarities of the real component and imaginary component of the input vector signal from said offset generating means and generating an output (c); and a second adder for adding the output (c) of said offset multiplier to an output of said first adder and for generating a numerical value indicative of the judgment phase angle ($\theta$).

13. An apparatus according to claim 10, further comprising rounding processing means for executing a rounding process to the numerical value of the phase angle ($\theta$) obtained by said judgment phase calculating means.

14. An apparatus according to claim 10, further comprising limiter means for limiting the numerical value of the phase angle ($\theta$) which is supplied from said judgment phase calculating means to said judgment phase information forming means to a specified range.

15. An apparatus according to claim 14, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of –N to 0 for $\pi \leq \theta \leq 2\pi$, where N is an arbitrary integer, said limiter means clips to an upper limit value +N when the numerical value of the phase angle ($\theta$) which is generated from said upper limit value +N and clips to a lower limit value –N when said numerical value is smaller than said lower limit value –N, thereby handling the judgment phase as a continuous amount of +N to –N.

16. An apparatus according to claim 10, wherein said judgment phase information forming means divides the phase plane into $2^n$ regions and forms bit information indicative of the region to which the phase angle ($\theta$) belongs.

17. A method of judging a timing phase of a modem for data communication, said method comprising the steps of:

a) inputting a vector signal (x+jy) which has a real component (x) and an imaginary component (y) sampled from a line reception signal into a digital value;

b) judging a quadrant of a phase plane to which the vector signal (x+jy) inputted in said inputting step a) belongs;

c) generating a rotational vector signal (a+jb) into the first quadrant on the basis of the result of the judgment in said judging step b), where a and b are a real component and an imaginary component respectively of (a+jb);

d) generating an offset phase angle ($\theta_2$) to return the input vector signal which was rotated into the first quadrant into the original signal on the basis of the result of the judgment in said judging step b);

e) multiplying a rotational vector signal (a+jb) obtained in said rotational vector generating step c) with said input vector signal (x+jy) and converting the sum into a vector signal (X+jY) in the first quadrant;

f) detecting a phase rotational angle ($\theta_1$) in the first quadrant of the vector signal (X+jY) which was rotated into the first quadrant in said multiplying step e), adding the offset phase angle ($\theta_2$) generated in said generating step d) on the basis of the result of the judgment in said judging step b) to said phase angle ($\theta_1$), and calculating a phase rotational angle ($\theta$) at the phase plane from the first to fourth quadrants in which the input vector signal is actually located; and g) dividing the phase plane into a plurality of regions at every predetermined angle and forming and generating phase judgment information indicative of the region to which the phase judgment information indicative of the region to which the phase rotational angle ($\theta$) obtained in said detecting step f).

18. A method according to claim 17, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, in said generating step c) the following values are generated in the first quadrant, a=+0.5N, b=0.00 in the second quadrant, a=0.00, b=0.5N in the third quadrant, a=−0.5N, b=0.00 in the fourth quadrant, a=0.00, b=+0.5N as values of a real component (a) and an imaginary component (b) of said rotational vector signal (a+jb).

19. A method according to claim 17, wherein said multiplying step e) comprises:

i) multiplying the rotational vector signal (a+jb) generated in said rotational vector generating step to said input vector signal (x+jy);

ii) separating the result (X+jY) of said multiplying step i) into a real component (X) and an imaginary component (Y) and obtaining a value (Y−X) in which the real component (X) is subtracted from said imaginary component (Y); and iii) multiplying a predetermined coefficient (k) to the result of the addition in said step ii).

20. A method according to claim 19, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, in said multiplying step iii), the coefficient K=0.25N is multiplied and the phase angle ($\theta_1$) of the vector signal which was rotated into the first quadrant is obtained as a numerical value of {(Y−X)·0.25N}.

21. A method according to claim 17, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, in said generating step d), the following values are generated in the first quadrant, $\theta_2$=+0.25N in the second quadrant, $\theta_2$=+0.75N in the third quadrant, $\theta_2$=−0.75N in the fourth quadrant, $\theta_2$=−0.25N as numerical values indicative of the offset phase angle ($\theta_2$).

22. A method according to claim 17, further comprising a step of executing a rounding process to the numerical value of the phase angle ($\theta$) obtained in said step f).

23. A method according to claim 17, further comprising a step of limiting the numerical value of the judgment phase angle ($\theta$) into a specified range subsequent to said step f), and in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, in said limiting step, when the numerical value of the phase angle ($\theta$) obtained in said step f) is larger than an upper limit value +N, said numerical value is clipped to said upper limit value +N, and when said numerical value is smaller than a lower limit value −N, said numerical value is clipped to said lower limit value −N, thereby handling the phase angle as a continuous amount in a numerical value range of +N to −N.

24. A method according to claim 17, wherein in said step g), the phase plane is divided into $2^n$ regions and bit information showing the region to which the phase angle ($\theta$) belongs is formed.

25. A method of judging a timing phase of a modem for data communication, said method comprising the steps of:

a) inputting a vector signal (x+jy) which has a real component (x) and an imaginary component (y) sampled from a line reception signal to a digital value;

b) generating values of coefficients (A, B) indicative of a phase angle ($\theta_1$) in correspondence to the polarities of a real component (x) and an imaginary component (y) of said input vector signal in the case where a relational expression $$\{-(xa-yb)+(ya+yb)\} \cdot K = Ax + By$$

showing the phase angle ($\theta_1$) of a vector signal (X+jY) which was rotated into a first quadrant by multiplying a rotational vector signal (a+jb) to the vector signal (x+jy) inputted in said inputting step is defined;

c) holding a real component offset value ($c_1$) and an imaginary component ($c_2$) showing an offset phase angle ($\theta_2$) to return the vector signal (X+jY) which was rotated into the first quadrant into the original signal in correspondence to the polarities of the real component (x) and imaginary component (y) of said input vector signal;

d) judging the polarities of the real component (x) and imaginary component (y) of said input vector signal;

e) obtaining a numerical value (Ax+By) indicative of the phase angle ($\theta_1$) when the input vector signal is rotated into the first quadrant on the basis of the corresponding coefficients (A, B) generated in said generating step b) in accordance with the result of the judgment in said judging step d), adding an offset value (c) indicative of the offset phase angle ($\theta_2$), to return the vector signal which was rotated into the first quadrant into the original signal on the basis of the corresponding offset values ($c_1$, $c_2$) generated in said step c), and obtaining a phase angle ($\theta$) of the vector signal; and f) dividing the phase plane into a plurality of regions at every predetermined angle and forming and generating phase judgment information indicative of the region to which the judgment phase angle ($\theta$) obtained in said step e) belongs.

26. A method according to claim 25, wherein in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of −N to 0 for $\pi \leq \theta \leq 2\pi$, in said generating step b), the following values are generated when x is positive, B=+0.25N when x is negative, B=−0.25N when y is positive, A=−0.25N when y is negative, A=+0.25N as said coefficients (A, B) for the polarities of the real component (x) and imaginary component (y) of the input vector signal, and in said step c), the following values are generated when x is positive, $c_1$=−0.25N when x is negative, $c_1$=+0.75N when y is positive, $c_2$=+0.50N when y is negative, $c_2$=−0.50N as each of said offset values ($c_1$, $c_2$) for the polarities of the real component (x) and imaginary component (y) of the input vector signal.

27. A method according to claim 25, wherein said step e) comprises the substeps of:
  i) multiplying in parallel each of the coefficients (A, B) generated in accordance with the polarities of the real component and imaginary component of the input vector signal in said coefficient generating step to each of the real component (x) and imaginary component (y) of the input vector signal;
  ii) adding the result of said multiplication;
  iii) multiplying the offset components ($c_1$, $c_2$) generated in accordance with the polarities of the real component and imaginary component of the input vector signal in said offset holding step; and
  iv) adding the offset value (c) obtained in said offset multiplying step to the result in said first adding step and generating the numerical value indicative of the judgment phase angle ($\theta$).

28. A method according to claim 25, further comprising a step of executing a rounding process to the numerical value of the phase angle ($\theta$) obtained in said judgment phase calculating step.

29. A method according to claim 25, further comprising a step of limiting the numerical value of the phase angle ($\theta$) which is obtained in said judgment phase calculating step and is supplied to said phase information forming step into a specified range, and in the case where the phase angle ($\theta$) of all of the quadrants of the phase plane is handled as a continuous amount in a numerical value range of 0 to +N for $0 \leq \theta \leq \pi$ and is also handled as a continuous amount in a numerical value range of $-N$ to 0 for $\pi \leq \theta \leq 2\pi$, in said limiting step, when the numerical value of the phase angle ($\theta$) obtained in said step e) is larger than an upper limit value +N, said numerical value is clipped to the upper limit value +N, and when said numerical value is smaller than a lower limit value $-N$, said numerical value is clipped to said lower limit value $-N$, thereby handling the judgment phase angle as a continuous amount in a numerical value range of +N to $-N$.

30. A method according to claim 25, wherein in said step f), the phase plane is divided into $2^n$ regions and bit information indicative of the region to which the phase angle ($\theta$) belongs is formed.

* * * * *